(12) United States Patent
Podd et al.

(10) Patent No.: US 8,162,164 B2
(45) Date of Patent: Apr. 24, 2012

(54) BULK LIQUID TRANSPORT SYSTEM

(76) Inventors: Stephen D. Podd, Rouses Point, NY (US); Victor I. Podd, Boca Raton, FL (US)

(*) Notice: Subject to any disclaimer, the term of this patent is extended or adjusted under 35 U.S.C. 154(b) by 935 days.

(21) Appl. No.: 12/105,025

(22) Filed: Apr. 17, 2008

(65) Prior Publication Data
US 2008/0257894 A1 Oct. 23, 2008

Related U.S. Application Data

(63) Continuation-in-part of application No. 11/737,651, filed on Apr. 19, 2007.

(51) Int. Cl.
*B65D 6/40* (2006.01)
*B65D 88/54* (2006.01)
*B65D 88/12* (2006.01)

(52) U.S. Cl. .......... 220/4.13; 220/1.5; 220/23.91; 220/661; 220/675

(58) Field of Classification Search .......... 220/4.13, 220/1.5, 23.91, 661, 669, 675
See application file for complete search history.

(56) References Cited

U.S. PATENT DOCUMENTS

| | | | |
|---|---|---|---|
| 1,815,653 A | 7/1931 | Jones |
| 2,144,181 A | 1/1939 | Du Bois |
| 2,626,885 A | 1/1953 | Gollings |
| 2,712,797 A | 7/1955 | Woehrle et al. |
| 2,748,673 A | 6/1956 | Winstead |
| 2,896,839 A | 7/1959 | Barnes et al. |
| 2,956,839 A | 10/1960 | Hermanns |
| 2,989,213 A | 6/1961 | Daggitt |
| 3,044,653 A | 7/1962 | Tantlinger |
| 3,061,133 A | 10/1962 | Reynolds |
| 3,085,707 A | 4/1963 | Tantlinger |
| 3,087,491 A | 4/1963 | Gewecke et al. |
| 3,087,759 A | 4/1963 | Worster |
| 3,105,617 A | 10/1963 | Felldin |
| 3,163,544 A | 12/1964 | Valyi |
| 3,167,209 A | 1/1965 | Jones |
| 3,170,600 A | 2/1965 | Pierson |
| 3,171,449 A | 3/1965 | Ellms et al. |
| 3,173,573 A | 3/1965 | Donegan |
| 3,199,726 A | 8/1965 | Pierson |
| 3,201,000 A | 8/1965 | Hermanns |
| 3,235,432 A | 2/1966 | George |
| 3,272,373 A | 9/1966 | Alleaume et al. |
| 3,273,761 A | 9/1966 | Langen |
| 3,275,197 A | 9/1966 | Eklund |
| 3,309,007 A | 3/1967 | Rosenburg et al. |
| 3,351,235 A | 11/1967 | Paton |
| 3,355,063 A | 11/1967 | Latham et al. |
| 3,356,251 A | 12/1967 | Roberts |
| 3,384,106 A | 5/1968 | Isbrandtsen |
| 3,386,605 A | 6/1968 | Lafont |
| 3,393,835 A | 7/1968 | Kantor |
| 3,421,665 A | 1/1969 | Paton |

(Continued)

*Primary Examiner* — Mickey Yu
*Assistant Examiner* — Niki Eloshway
(74) *Attorney, Agent, or Firm* — Bernard S. Klosowski, Jr.

(57) ABSTRACT

A transport tank system includes a molded thermoplastic tank defining an aperture therethrough and having a discharge end and an opposing end, the thermoplastic tank being rigidly configured for holding a consumable cargo received through the aperture and including a material resistant to passage of oxygen to preserve the consumable cargo. The tank is capable of standing alone for storing the consumable cargo, or the tank can be loaded into a standard dry box container to convert the dry box container into a bulk liquid transport container.

18 Claims, 13 Drawing Sheets

U.S. PATENT DOCUMENTS

| | | | |
|---|---|---|---|
| 3,477,610 A | 11/1969 | Hansen | |
| 3,574,332 A | 4/1971 | Wetzel | |
| 3,578,213 A | 5/1971 | Clarke | |
| 3,583,330 A | 6/1971 | Freudman | |
| 3,590,888 A | 7/1971 | Coleman | |
| 3,595,408 A | 7/1971 | Eddy et al. | |
| 3,604,578 A | 9/1971 | Smith | |
| 3,696,952 A | 10/1972 | Bodenheimer | |
| 3,726,067 A | 4/1973 | Fesco | |
| 3,756,469 A | 9/1973 | Clark et al. | |
| 3,762,341 A | 10/1973 | Alder | |
| 3,914,361 A | 10/1975 | Shiina et al. | |
| 3,941,258 A | 3/1976 | Ide | |
| 3,951,284 A | 4/1976 | Fell et al. | |
| 3,978,996 A | 9/1976 | Oltrogge | |
| 3,980,196 A | 9/1976 | Paulyson et al. | |
| 4,054,226 A | 10/1977 | Bjelland et al. | |
| 4,106,950 A * | 8/1978 | Grismer | 134/10 |
| 4,124,136 A | 11/1978 | Bjelland et al. | |
| 4,170,946 A | 10/1979 | Youness | |
| 4,186,845 A | 2/1980 | Podd | |
| 4,230,061 A | 10/1980 | Roberts et al. | |
| 4,232,803 A | 11/1980 | Muller et al. | |
| 4,251,013 A | 2/1981 | Krause | |
| 4,254,885 A | 3/1981 | Fouss et al. | |
| 4,334,812 A | 6/1982 | Delatush | |
| 4,345,862 A | 8/1982 | Blout et al. | |
| 4,358,233 A | 11/1982 | Morris et al. | |
| 4,385,953 A | 5/1983 | Beck | |
| 4,394,966 A | 7/1983 | Snyder et al. | |
| 4,399,737 A | 8/1983 | Severson | |
| 4,421,250 A | 12/1983 | Bonerb et al. | |
| 4,441,627 A | 4/1984 | Takeuchi | |
| 4,441,678 A | 4/1984 | Dorpmund | |
| 4,461,402 A | 7/1984 | Fell et al. | |
| 4,470,749 A | 9/1984 | Koudstaal | |
| 4,498,824 A | 2/1985 | Kinkle | |
| 4,556,349 A | 12/1985 | Koudstaal et al. | |
| 4,574,825 A * | 3/1986 | Haug | 134/167 R |
| 4,595,126 A | 6/1986 | Holmes | |
| 4,629,390 A | 12/1986 | Burke | |
| 4,635,814 A | 1/1987 | Jones | |
| 4,673,112 A | 6/1987 | Bonerb | |
| 4,701,087 A | 10/1987 | Cain et al. | |
| 4,784,287 A | 11/1988 | Yamada et al. | |
| 4,785,958 A | 11/1988 | Snyder | |
| 4,799,607 A | 1/1989 | Podd | |
| 4,854,801 A | 8/1989 | Bonerb | |
| 4,884,722 A | 12/1989 | Podd | |
| 4,911,317 A | 3/1990 | Schloesser et al. | |
| 4,913,321 A | 4/1990 | Abboud | |
| 4,960,227 A | 10/1990 | Coleman | |
| 5,010,943 A | 4/1991 | Boyer | |
| 5,040,693 A | 8/1991 | Podd, Sr. et al. | |
| 5,059,084 A | 10/1991 | Krein | |
| 5,069,352 A | 12/1991 | Harbolt et al. | |
| 5,110,000 A | 5/1992 | Nichols | |
| 5,137,170 A | 8/1992 | Matias | |
| 5,152,735 A | 10/1992 | Podd, Jr. et al. | |
| 5,156,268 A | 10/1992 | Nichols | |
| 5,167,472 A | 12/1992 | Podd, Sr. et al. | |
| 5,181,625 A | 1/1993 | Podd, Sr. et al. | |
| 5,188,252 A | 2/1993 | Gerhard | |
| 5,193,710 A | 3/1993 | Podd, Sr. et al. | |
| 5,217,184 A | 6/1993 | Hararat-Tehrani | |
| 5,222,621 A | 6/1993 | Matias | |
| 5,330,070 A | 7/1994 | Gerhard et al. | |
| 5,421,476 A | 6/1995 | Matias | |
| 5,465,865 A | 11/1995 | Coombes | |
| 5,524,781 A | 6/1996 | Podd et al. | |
| 5,542,563 A | 8/1996 | Matias | |
| 5,673,664 A | 10/1997 | Lassanske | |
| 5,688,086 A | 11/1997 | Menzemer et al. | |
| 5,738,240 A | 4/1998 | Vavra et al. | |
| 5,819,970 A * | 10/1998 | Solimar | 220/1.5 |
| 5,836,472 A | 11/1998 | Vavra et al. | |
| 5,911,337 A * | 6/1999 | Bedeker | 220/562 |
| 6,012,598 A | 1/2000 | Antoniou | |
| 6,286,700 B1 | 9/2001 | Davidson | |
| 6,527,134 B2 | 3/2003 | Hinkle et al. | |
| 6,637,469 B2 | 10/2003 | Hoffman et al. | |
| 6,726,052 B1 | 4/2004 | Miller | |
| 7,150,373 B2 | 12/2006 | Richter | |
| 7,178,686 B2 * | 2/2007 | Bolzer et al. | 220/567.1 |
| 2004/0188447 A1* | 9/2004 | Bolzer | 220/653 |
| 2006/0163246 A1 | 7/2006 | Pfau | |
| 2006/0175324 A1 | 8/2006 | Podd et al. | |
| 2007/0193649 A1 | 8/2007 | Podd | |

* cited by examiner

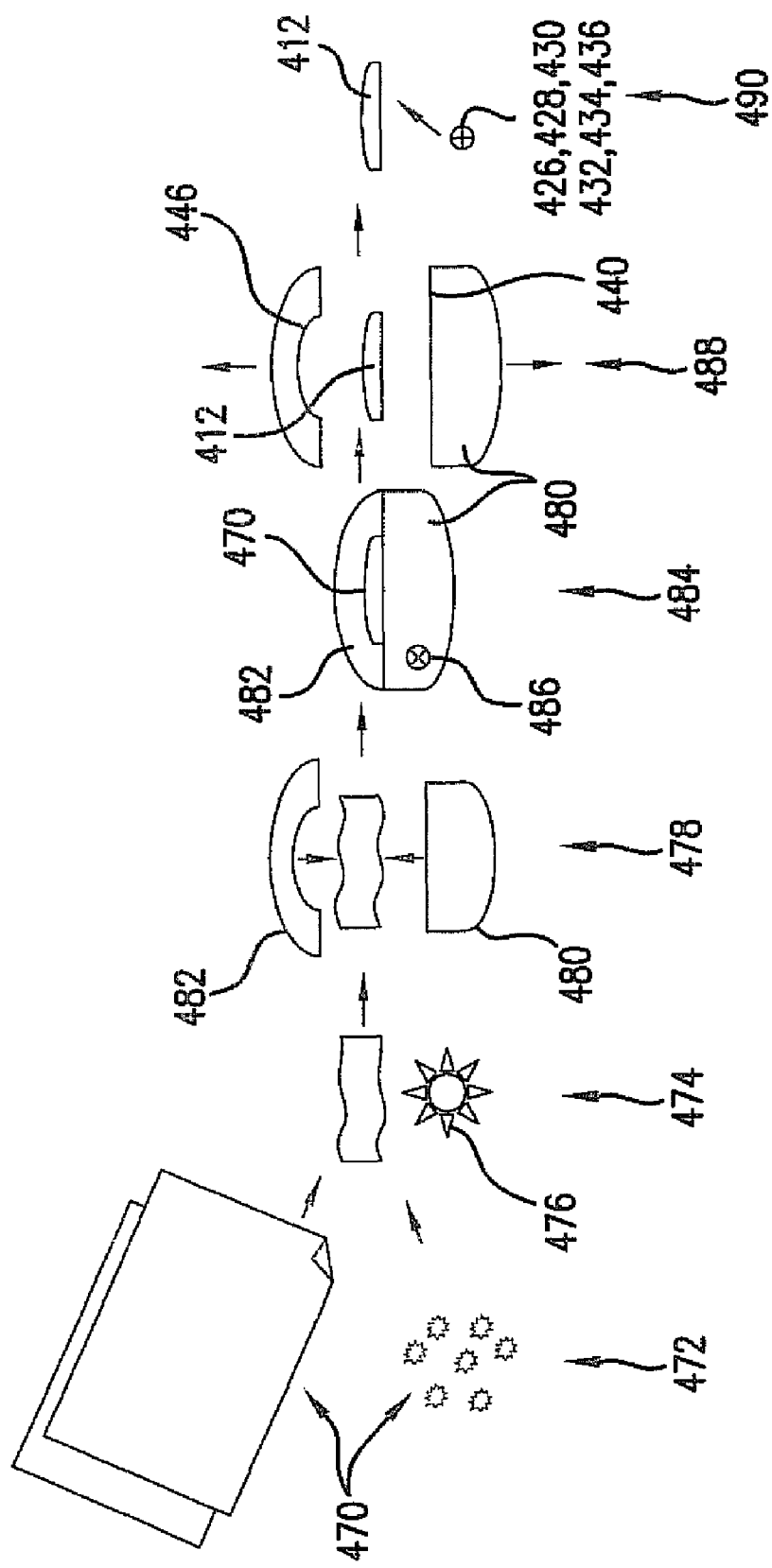

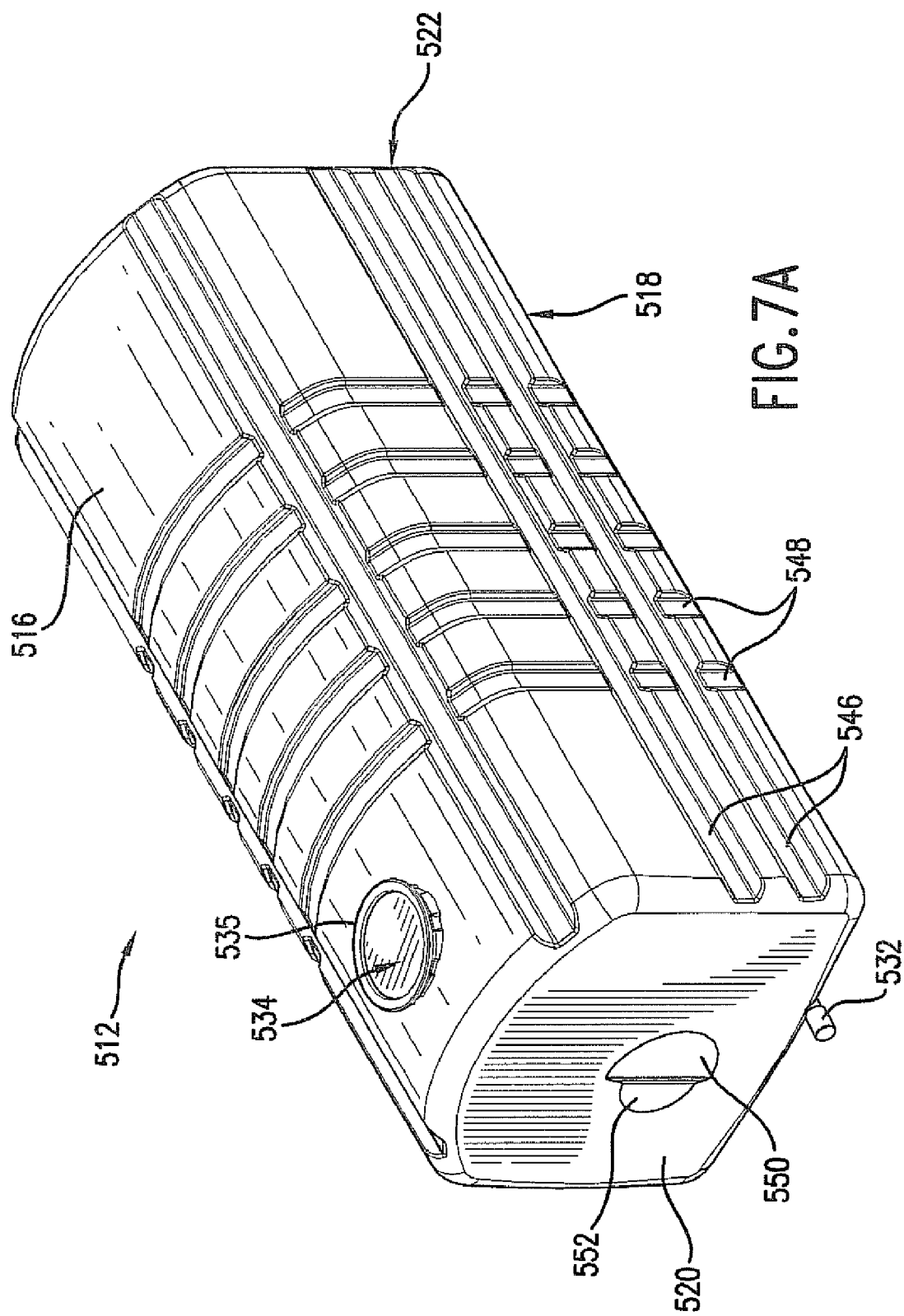

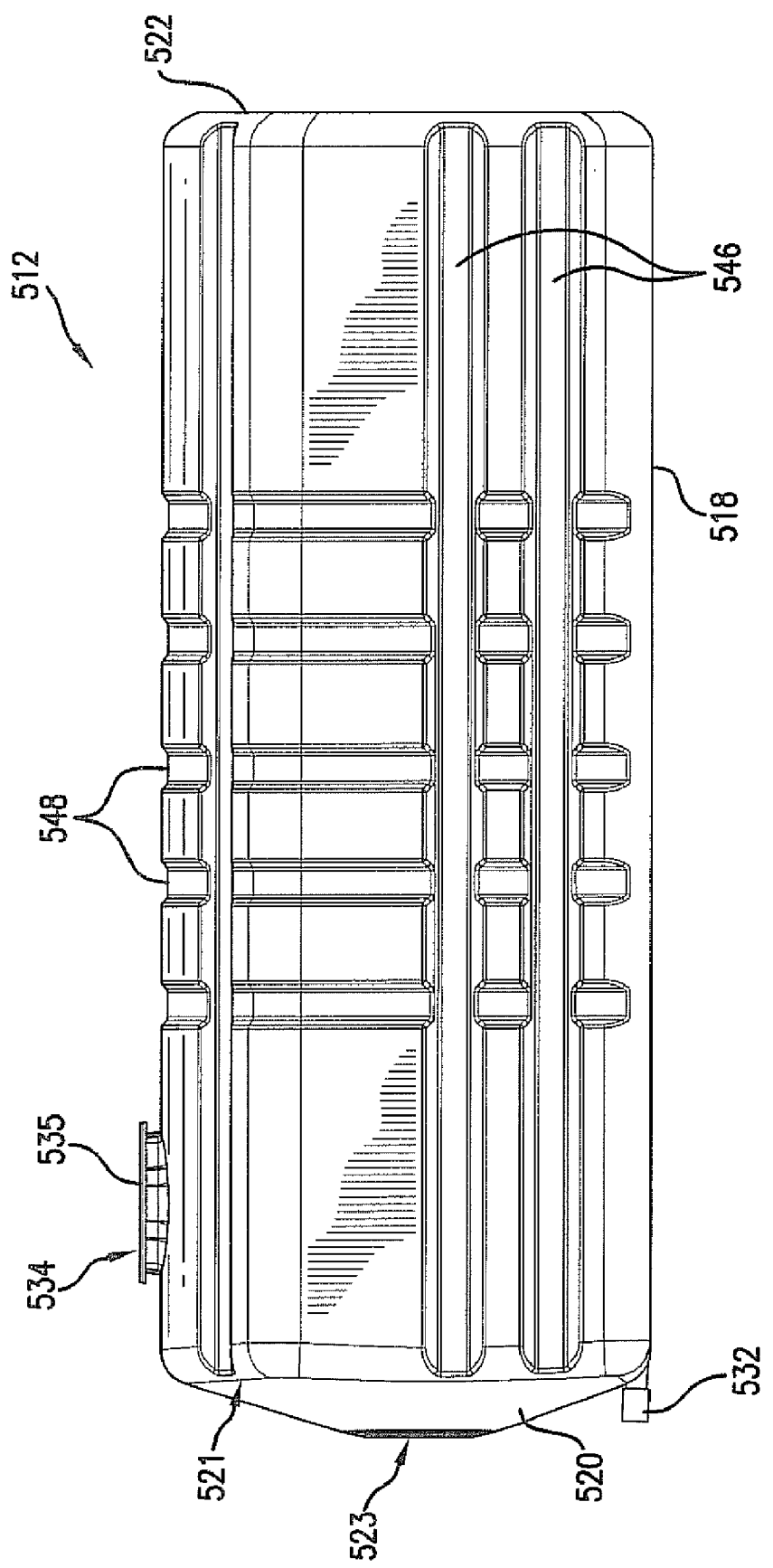

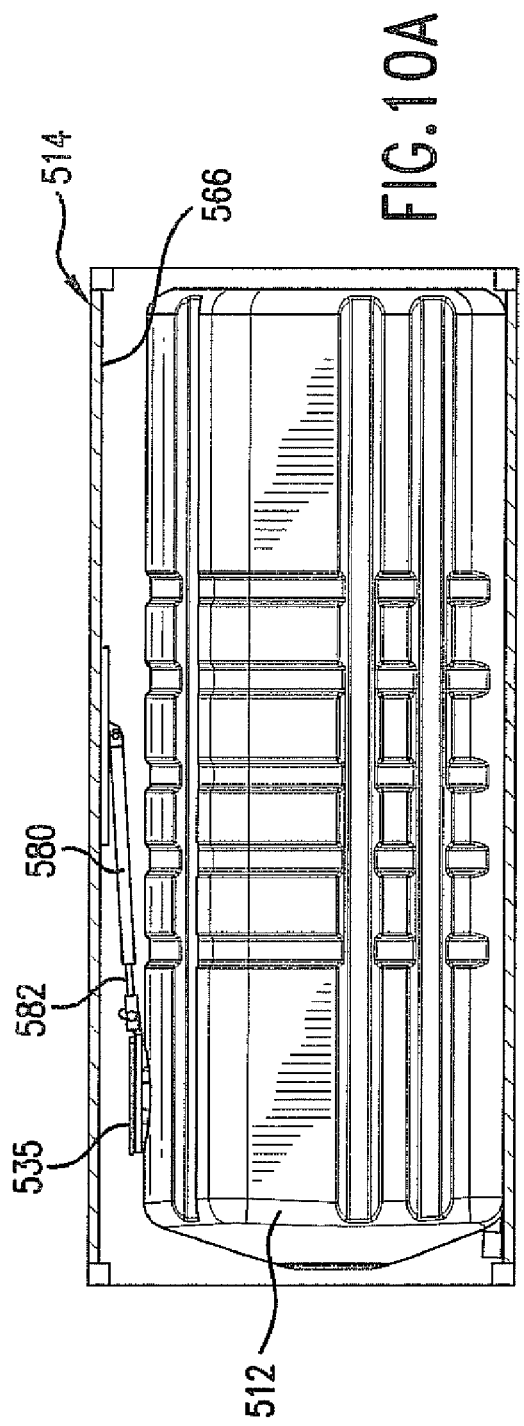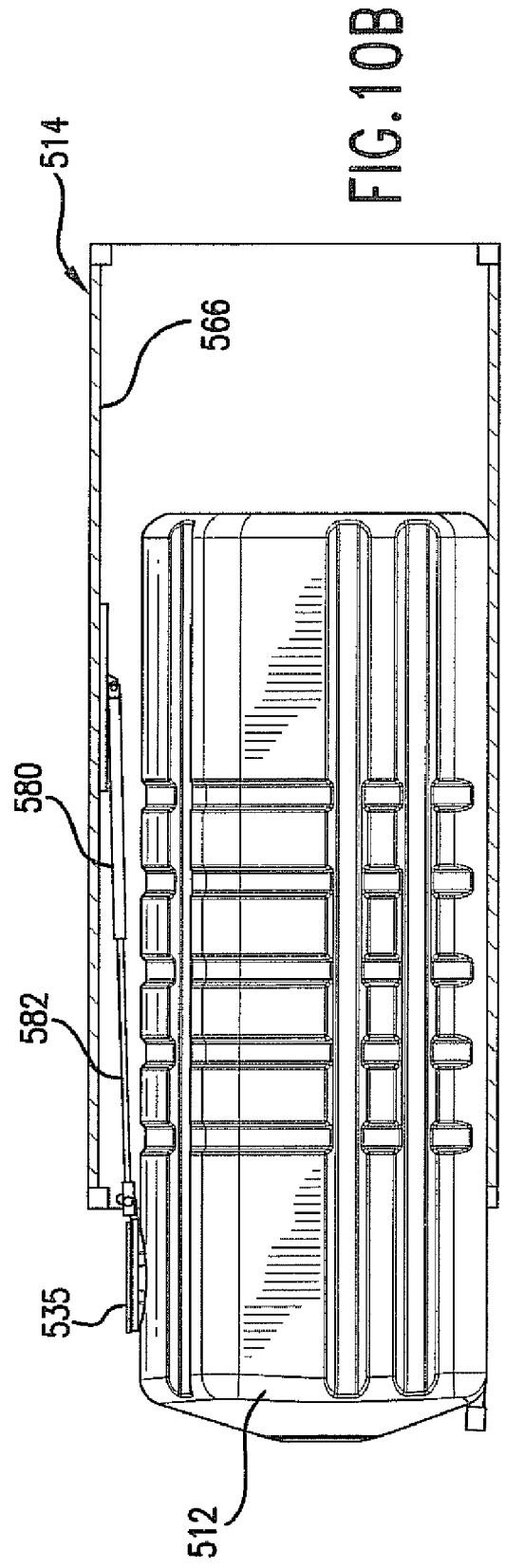

BULK LIQUID TRANSPORT SYSTEM

CROSS-REFERENCE TO RELATED APPLICATIONS

This application is a Continuation-In-Part of co-pending U.S. application Ser. No. 11/737,651, filed Apr. 19, 2007, and entitled "Bulk Liquid Transport System", the disclosure of which is hereby incorporated by reference.

TECHNICAL FIELD

The present disclosure is directed, in general, to the field of bulk cargo transport tanks or containers. Specifically, the disclosure is directed to bulk transport containers for liquids and, more specifically, to thermoplastic containers having a substantially frustopyramidal discharge end. Also provided herein are a method and mechanism for inserting and extracting such a thermoplastic container from a transport container (such as a tractor trailer), such mechanism including a fluid-filled cylinder cooperatively attached, at one end, to a manlid on the thermoplastic container and, on the other end, to the interior of the transport container.

BACKGROUND

A variety of procedures and systems are used to transport liquids in bulk quantities. For instance, vehicles designed specifically for liquid transport are available in motor, sea, and rail transport forms. Because vehicles designed exclusively for liquid cargo cannot usually be used for other types of cargo, the ability to effectively employ these vehicles is often limited. In a preferred situation, a liquid cargo vehicle may be used to transport a first type of liquid cargo to a first destination and then may be used to "backhaul" a second type of liquid cargo from the first destination to the point of origin. While such a preferred situation optimizes the utility of the liquid cargo container, many logistical considerations must be overcome to be practical on a large scale. Thus, for the most part, the productivity of many conventional liquid transport vehicles is reduced.

Rather than being limited to using specifically designed liquid transport vehicles, others have attempted to use general purpose vehicles for transport of liquid cargo. One known method is to secure a deformable liner to inner walls of a cargo vehicle. The bottom of the liner rests on the floor of the vehicle. As the vehicle is loaded, the liquid presses the liner against the floor and walls, thus filling the vehicle.

While useful for some types of cargo, this method is undesirable for food or other products that may be susceptible to contamination or spoiling. Additionally, since the cargo is unrestrained in the liner-general purpose vehicle, any movement of the vehicle may cause a surging weight shift that can destabilize the vehicle. Baffles have been used to reduce the surging problem in this type of container, but the baffles increase the cost of the liner. Baffles also increase transport surface area exposed to the cargo, which increases the possibility of contamination. Moreover, baffles ultimately have a relatively limited effect on surging due to the high mass of most liquid cargos.

Flexitank or pillow containers have been developed that are sealed to prevent exposure to ambient air. These flexitank containers typically have air pockets that allow surging when the vehicle is in motion. However, bulkheads are often required to hold the ends of the bags in place when vehicle doors are opened. These bulkheads are typically expensive and time consuming to install. In addition, approval from government agencies (such as the U.S. Food and Drug Administration) often is required to use flexitanks. Moreover, when transporting food stuffs or other consumable items, flexitanks often require inner liners, which add to their cost.

As shown in FIG. 11, when attempting to convert and utilize a conventional transport system 701 to carry a liquid cargo, a dry box shipping container 703 usually must be lined with plastic or cardboard 705 prior to the installation of the flexitank 707 in order to prevent punctures and leakage of the flexitank 707. If the flexitank 707 is punctured, or if a seal breaks, an entire cargo can be lost due to drainage.

As is evident from FIG. 11, the flexitank 707 when fully filled can place extreme stresses on the walls of the dry box shipping container 703, which can cause the walls and doors to bow out during transport. This is extremely prevalent during rail voyages where rail cars are shunted. Total losses of such dry box shipping containers are not uncommon, with claims and damages ultimately being incurred by the shippers and costs passed on to consumers.

In addition to the foregoing problems, due to ensuing and expensive environmental clean-up issues, many steamship lines simply have banned the use of the flexitank or pillow containers.

Shipment of bulk liquids has also been attempted by loading the liquid into drums and securing the drums inside the transport vehicles. While this approach tends to reduce exposure to air, thereby reducing risk of contamination to some cargo, this method has proven to be unsuitable for most food items, since avoiding all metal contact with food items is practically impossible and contamination from other sources is nevertheless possible.

Yet a further disadvantage of using drums for liquid cargo shipment is the high costs entailed. The drums themselves are expensive, and filling, loading, and unloading each drum are expensive, labor-consuming activities. Additionally, as the drums are loaded onto the vehicle, they must be restrained, or else movement of the vehicle may cause the drums to be damaged or overturned in transit. Thus, the cost of using drums is increased further due to the need to provide pallets on which to secure the drums during transit. More specifically, the cost of the pallets and fumigation become part of the cost of the cargo. Also, the space taken by the pallets during the trip reduces the amount of usable cargo space. Finally, the drums themselves must be disposed of or returned at the end of each transit.

Another attempt to ship bulk liquid, viscous, or powder cargo has been to use containers approved by the International Organization for Standardization (ISO). Unfortunately, these stainless steel ISO containers are very expensive and, to be commercially viable, must be used for hundreds of shipments and must be amortized over decades. Additionally, substantial costs are invariably incurred for repositioning and repairing ISO containers. All told, the high costs associated with ISO containers ultimately add to the cost of the cargo being transported.

While addressing the basic desirability of using general purpose transport vehicles to move bulk cargo, such as liquid, previous efforts have failed to provide a single bulk transport system, which is inexpensive to manufacture and which is durable enough to be cleaned and reused. A solution must also be robust enough to prevent leakages and not put undue stress on dry box shipping container walls and doors. Moreover, a bulk cargo transport system is also needed in the shipping industry that can pay for itself in three to four shipments and that can be amortized over about three to six months as opposed to, e.g., 20 years.

BRIEF SUMMARY OF THE DISCLOSURE

The present disclosure is directed, in general, to bulk cargo transport tanks or containers. The components of the containers are simple to manufacture, install, and use.

The bulk cargo transport containers described herein may be formed of a rigid material in a variety of shapes; e.g., cylindrical, semi-cylindrical or arcuate, rectangular, or otherwise, as required by the industry. The containers may be constructed using a single layer or co-extruded layers of material and may be employed for transportation of a wide variety of materials, including foodstuffs, chemicals, and industrial liquids. The present containers meet and exceed FDA and EC food grade certifications and are Kosher certified.

The stability of the bulk liquid transport containers may be enhanced by incorporating varying thicknesses of the rigid material. Additionally, or alternately, the containers may be stabilized by molding a convex upper surface and/or reinforcing members on or into the containers to increase strength and to reduce surging of liquid cargo, as may occur, for instance, when the container is being transported.

The containers may be filled by pressure, venting air from a vent located on a top surface of the container. A bottom surface of the container may be rectangular, square, or oblong to allow for maximum payload. The containers may be manufactured with a slight incline towards a discharge end to facilitate complete discharge of the product. Vent, fill, and discharge connections may be located at a rear area, such as a rear door area of an outer dry box container, for easy access and worker safety. The containers may further include manlid clean out ports for accessing and cleaning the interiors of the containers after cargo shipment.

More particularly, in one aspect of the disclosure, a transport tank system includes a vacuum-formed, or rotationally molded, thermoplastic tank defining an aperture therethrough and having a discharge end and an opposing end, the discharge and opposing ends disposed opposite each other to define a first major axis of the thermoplastic tank, a first minor axis defined between the discharge and opposing ends substantially perpendicular to the first major axis, the thermoplastic tank being rigidly configured for holding a consumable cargo received through the aperture; and a transport container having a second major axis and a second minor axis, the thermoplastic tank being disposed in the transport container, the second major and minor axes being respectively complementary to the first major and minor axes of the thermoplastic tank, the tank being further configured for discharge of the consumable cargo.

In this aspect, the vacuum-formed, or rotationally molded, thermoplastic tank may be substantially cylindrical in shape.

Also in this aspect, the vacuum-formed, or rotationally molded, thermoplastic tank may include at least one arcuate surface.

Further, in this aspect, the vacuum-formed, or rotationally molded, thermoplastic tank may include a material resistant to passage of oxygen.

Also in this aspect, the material may include an ethylene vinyl alcohol copolymer resin. Further, the material may be disposed on an internal surface of the vacuum-formed thermoplastic tank, the internal surface being in contact with the consumable cargo.

Further, in this aspect, the first major axis is longer than the first minor axis of the vacuum-formed, or rotationally molded, thermoplastic tank.

Also in this aspect, the opposing end may be disposed above the discharge end to define an incline, the incline being configured to facilitate emptying of the consumable cargo from the vacuum-formed, or rotationally molded, thermoplastic tank.

Further, in this aspect, the aperture may be a fill connection device.

Also in this aspect, the transport container may be a dry box shipping container, the vacuum-formed, or rotationally molded, thermoplastic tank being configured to convert the dry box shipping container into a bulk liquid shipping container.

Further, in this aspect, the transport container may include a plurality of interior surfaces defining an interior space therein, the vacuum-formed, or rotationally molded, thermoplastic tank being configured to mate against the interior surfaces to occupy the interior space such that the thermoplastic tank is immobilized in the transport container.

Also in this aspect, a vent may be attached to the thermoplastic tank, the vent being in communication with an internal surface of the thermoplastic tank and being configured to vent air from the thermoplastic tank for filling the thermoplastic tank.

According to another aspect of this disclosure, an inflatable device may be disposed on the internal surface, the inflatable device being configured for inflation to fill the void, or empty space, remaining in the tank after the tank's contents have been added. The inflatable device, which may be made of a polyethylene material, is further configured for deflation after the air has been vented from the thermoplastic tank.

Further, in this aspect, a discharge connection may be attached to the thermoplastic tank, the discharge connection being in communication with an internal surface of the thermoplastic tank, the discharge connection being configured to empty the consumable cargo from the thermoplastic tank.

Also in this aspect, a port may be attached to the thermoplastic tank, the port being in communication with an internal surface of the thermoplastic tank for cleaning the thermoplastic tank.

Further, in this aspect, a pallet assembly may be formed integrally with the thermoplastic tank.

Also in this aspect, a barrier wrapper may be disposed about the thermoplastic tank.

In another aspect of the disclosure, a method of forming a transport tank system includes providing a thermoplastic material; heating the thermoplastic material until the thermoplastic material is malleable; placing the heated thermoplastic material into a tank mold; vacuum forming the heated thermoplastic material into a shape complementary to the tank mold; and cooling the shape into vacuum-formed thermoplastic tank for consumable products.

Also in this aspect, the thermoplastic material may be a sheet of thermoplastic material, may be a plurality of thermoplastic pellets, or may be a combination thereof.

Further, in this aspect, the vacuum-formed thermoplastic tank may include a material resistant to passage of oxygen. The material may include an ethylene vinyl alcohol copolymer resin.

Also in this aspect, the tank mold may include a plurality of depressions defined therein, the depressions forming a plurality of reinforcing members that project from the outer surface of the vacuum-formed thermoplastic tank.

Further, in this aspect, the tank mold may include a plurality of depressions defined therein, the depressions forming a plurality of steps or handholds that project from a surface of the vacuum-formed thermoplastic tank.

Also in this aspect, the tank mold may include a plurality of projections defined therein, the projections forming a pallet assembly integral to the vacuum-formed thermoplastic tank, the pallet assembly having a plurality of openings therein for receipt of respective tines of a forklift for moving the vacuum-formed thermoplastic tank.

Further, in this aspect, the tank mold may be configured to form an incline to facilitate unloading the consumable product.

Also in this aspect, the method may include attaching one of a vent, a connection, or a hatch to the vacuum-formed thermoplastic tank.

Also in this aspect, the method may include providing a heating device for maintaining a predetermined temperature of the consumable product.

Also in this aspect, the method may include inserting a bladder in the vacuum-formed thermoplastic tank, the bladder being configured for inflation to fill the void, or empty space, remaining in the tank after the tank's contents have been added.

Also in this aspect, the method may include injecting air into the tank mold while vacuum forming the heated thermoplastic material.

In a further aspect of the disclosure, a transport tank system may include an arcuate-shaped thermoplastic tank defining an aperture therethrough and having a discharge end and an opposing end, the discharge and opposing ends disposed opposite each other to define a first major axis of the thermoplastic tank, a first minor axis defined between the discharge and opposing ends substantially perpendicular to the first major axis, the thermoplastic tank being rigidly configured for holding a consumable cargo and including a material resistant to passage of oxygen to preserve the consumable cargo. The consumable cargo may be loaded through the aperture or through a fill-discharge connection.

Also in this aspect, the thermoplastic tank may be a vacuum-formed thermoplastic tank.

Further, in this aspect, the thermoplastic tank may be a rotationally molded thermoplastic tank.

Also in this aspect, the material may include an ethylene vinyl alcohol copolymer resin.

Further, in this aspect, the thermoplastic tank may include a plurality of reinforcing members configured to increase a rigidity of the thermoplastic tank, the thermoplastic tank being configured for stand-alone storage of the consumable cargo or for shipping the consumable cargo.

Also in this aspect, the thermoplastic tank may include a component selected from the group consisting of an air vent, a hatch, a handhold, a filling-discharge connection, and a heating device.

This aspect may include a metal transport container, the thermoplastic tank being disposed in the transport container.

In yet another aspect of the disclosure, a method of storing a transport tank system, when empty, includes providing at least two polymeric tanks; and stacking one of the polymeric tanks on the other polymeric tank.

The method may also include vacuum-forming, or rotationally molding, the polymeric tanks.

The method may also include forming a respective stacking element and an opposing depression on each of the polymeric tanks, the respective stacking elements and depressions being configured to mate with each other to stack one of the polymeric tanks on the other polymeric tank.

The method may also include storing the bulk consumable cargo in the polymeric tanks.

The method may also include placing the polymeric tanks in a shipping container.

According to yet another aspect of the present disclosure, a thermoplastic container is provided, which is rigidly configured for holding a consumable cargo. The themoplastic tank further is defined as having a discharge end, an opposing end opposite the discharge end, and an upper surface defining a manhole therethrough. The thermoplastic tank includes a first major axis being oriented longitudinally between the discharge end and the opposing end and a first minor axis being oriented transverse to the first major axis and being disposed between the discharge end and the opposing end. In this aspect, the discharge end is substantially frustopyramidally shaped, having a planar base that is proximal to the opposing end, a terminal planar surface that is distal to the opposing end, and a discharge connection proximate to and extending from the base. Within the discharge end are located a first semi-circular, or half-moon, panel and a corresponding semi-circular second panel, the first panel being recessed from the terminal planar surface and the second panel being coincident with and forming the terminal planar surface.

Further, in this aspect, the thermoplastic tank includes a plurality of reinforcing members that are integral to the tank.

Also in this aspect, the first semi-circular panel is larger than the second semi-circular panel, the first being located on the same side of the thermoplastic tank as the discharge connection.

A discharge connection provided in this aspect is located proximate the discharge end of the thermoplastic tank. The discharge connection extends from the discharge end toward the terminal planar surface and terminates at a plane between the base and the terminal surface of the discharge end.

Also provided in this aspect, the manhole of the thermoplastic tank is reinforced by a plurality of reinforcing members.

Further, the thermoplastic tank includes a manlid configured for mating with the manhole, or aperture.

In yet another aspect of the present disclosure, a bulk transport system is provided, which includes a thermoplastic tank, a transport container, and a fluid-filled cylinder. The thermoplastic tank includes an aperture, or manhole, on the upper surface of the thermoplastic tank. A first end of the fluid-filled cylinder is attached to a perimeter of the manhole, and an opposite end of the fluid-filled cylinder is attached to the ceiling of the transport container, such that movement of the thermoplastic tank into and out of the transport container is facilitated.

Further, in this aspect, the fluid-filled cylinder is a hydraulic cylinder.

Alternately, in this aspect, the fluid-filled cylinder is a pneumatic cylinder.

According to a further aspect of the present disclosure, a method of moving a thermoplastic tank into and out of a transport container includes the steps of (a) providing a thermoplastic tank, according to the teachings herein, the thermoplastic tank having an aperture defined through an upper surface thereof; (b) providing a transport container, capable of housing the thermoplastic tank and having walls, a floor, and a ceiling; and (c) providing a fluid-operated cylinder, attaching a first end of the cylinder to a perimeter of the aperture and attaching an opposite end of the cylinder to the ceiling of the transport container, such that retraction of the cylinder piston causes the thermoplastic tank to move into the transport container and extension of the cylinder piston causes the thermoplastic tank to move out of the transport container.

Yet another aspect of the disclosure provides a method of cleaning the interior surfaces of a thermoplastic tank. The method includes the steps of inserting at least one revolving sprayhead through the manhole; activating the sprayhead to spray liquid at the interior surfaces of the tank; and draining the liquid through the discharge connection.

Further, in this aspect, the cleaning liquid may be selected based on the last-carried contents of the thermoplastic tank. Accordingly, the cleaning liquid may be one of water, hot water, diesel fuel, caustic, solvents, detergents, chemical strippers, and appropriate combinations thereof.

Also, in this aspect, the thermoplastic tank is a rotationally molded tank having exceptionally smooth interior surfaces.

Finally, in this aspect, the thermoplastic tank may include a plurality of reinforcing members that extend inwardly into the interior surfaces of the thermoplastic tank. The reinforcing members may have a multi-faceted geometry to promote discharge and cleaning.

Other advantages of various embodiments of the disclosure will be apparent from the following description and the attached drawings, or can be learned through practice of the disclosure.

BRIEF DESCRIPTION OF THE DRAWINGS

A full and enabling disclosure, including the best mode thereof to one skilled in the art, is set forth more particularly in the remainder of the specification, including reference to the accompanying figures, in which:

FIG. 6 is a schematic view of an exemplary manufacturing process line for a container according to yet another aspect of the disclosure;

FIG. 7A is an isometric view of a container according to yet another aspect of the disclosure;

FIG. 7B is a side view of the container of FIG. 7A;

FIG. 10A is a cross-sectional view of a transport system, according to another aspect of the disclosure, particularly showing the container of FIG. 7A in a retracted position within a tractor trailer or other shipping container;

FIG. 10B is a cross-sectional view of the transport system of FIG. 10A, showing the container of FIG. 7A being extended from the tractor trailer or other shipping container.

DETAILED DESCRIPTION OF THE DISCLOSURE

Figure 1:
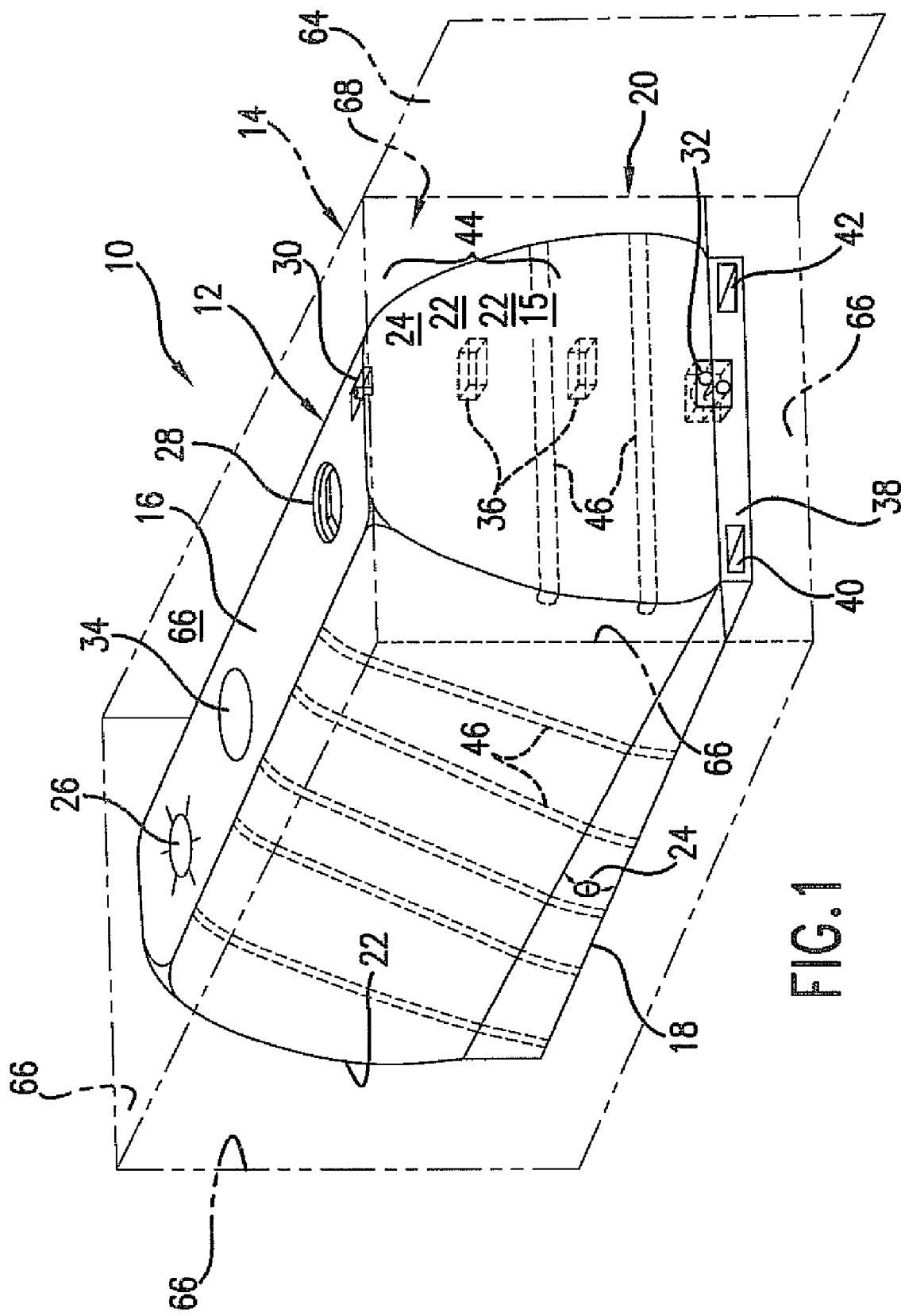
FIG. 1 is a perspective view of a transport system particularly showing a container in a dry box (in phantom) according to an aspect of the disclosure.

Detailed reference will now be made to the drawings in which examples of the present disclosure are shown. The detailed description uses numerical and letter designations to refer to features of the drawings. Like or similar designations of the drawings and description have been used to refer to like or similar parts of the disclosure.

The drawings and written description provide a full and detailed description of examples of the disclosure, of the manner and process of making and using these examples, and of the best mode of carrying out the disclosure, so as to enable one skilled in the pertinent art to make and use the examples. The examples set forth in the drawings and detailed description are provided by way of explanation only and are not meant as limitations of the disclosure. The present disclosure thus includes any modifications and variations of the following examples as come within the scope of the appended claims and their equivalents.

The figures generally show bulk cargo shipping systems, which generally include a molded (e.g., thermo-formed or vacuum-formed or rotationally molded) container (also referred to herein as a tank or "bottle"). The bulk cargo shipping systems may also include external dry boxes in which the container may fit with minimal clearance to maximize shipping space and to immobilize the container during shipment. These and other advantages and benefits will be better understood from the following description and exemplary methods of operation.

Figure 2:
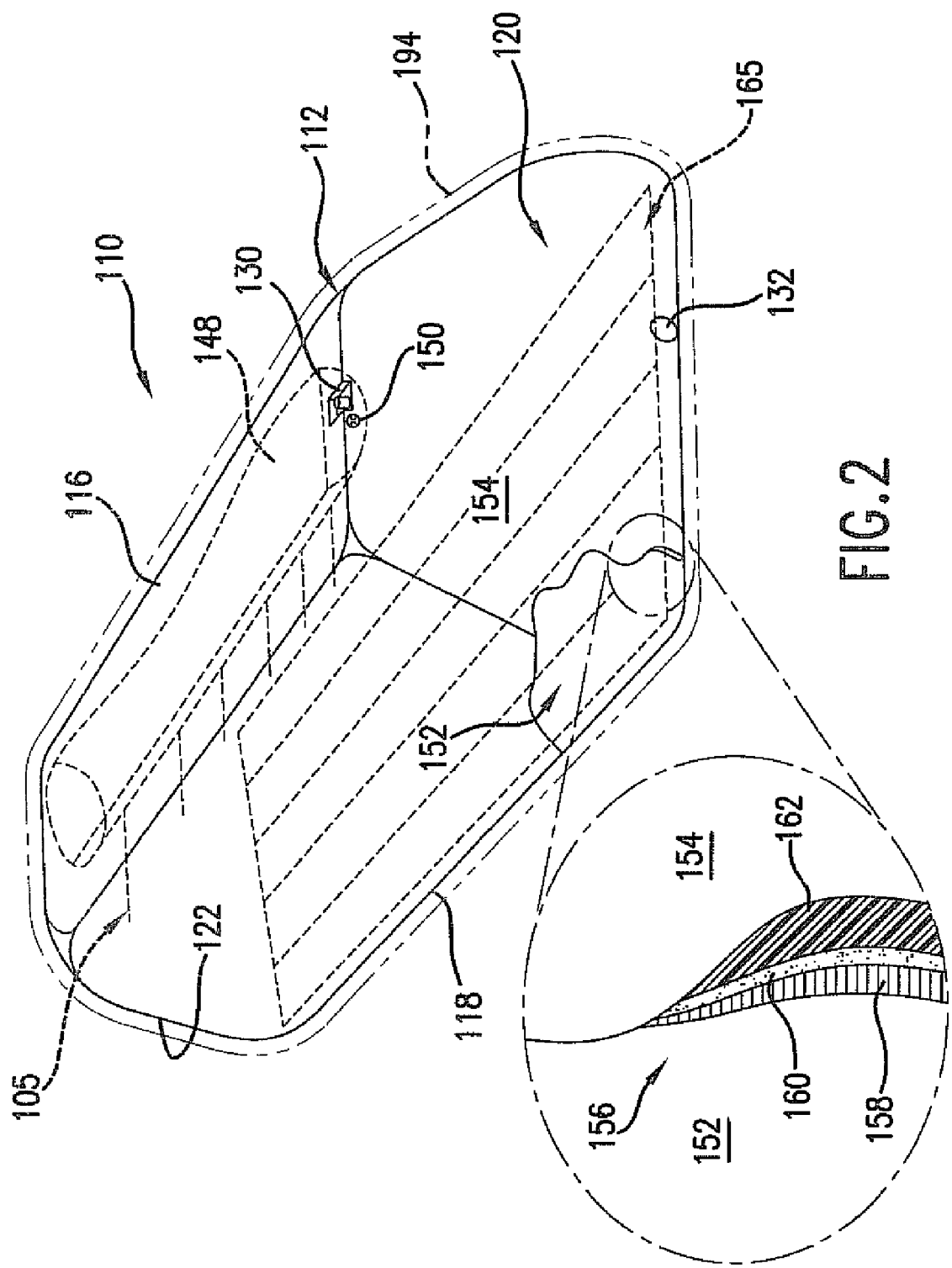
FIG. 2 is a partially cutaway, perspective view of a container according to another aspect of the disclosure particularly showing various materials that may be used to manufacture the container.

With reference now to FIG. 1, according to an aspect of the present disclosure, a transport container system is designated in general by the element number 10 and may include a container 12 that may be used for transporting or storing liquid, powder or other bulk product or cargo (see, e.g., liquid cargo 105, FIG. 2). The container 12 itself may be inserted and transported in a conventional stainless steel trailer or dry box 14 (depicted in phantom for clarity). As shown, the container 12 includes an upper surface or layer 16, which may be flat, convex, or arcuate (as illustrated), and may further include an opposing bottom surface 18 that may be rectangular or square. These and other shapes and arrangements can serve to maximize cargo payload and to increase structural integrity as discussed in greater detail below.

As further shown in FIG. 1, a discharge end 20 and an opposing end 22 define an incline 24 depicted by angle θ, which slants or slopes upward from the discharge end 20 to the opposing end 22 to facilitate gravitational product discharge. In this example, the angle θ of the incline 24 is about 50 degrees as measured from the discharge end 20 to the opposing end 22 relative to horizontal. The skilled artisan will recognize that the angle θ may be more or less than 50 degrees as required. For instance, an increased angle θ may facilitate more rapid product discharge. Additionally, or in the alternative, the container 12 may be equipped with pressure discharge capability of about 0.25 BAR (3.675 PSI) to further facilitate discharge of thick, viscous products by forcing the product out the discharge valve. For example, a discharge connection 32, or a separate valve system, may include this pressure discharge capability. The skilled artisan will understand, of course, that the discharge connection 32 may be capable of pressure discharge more or less than 0.25 BAR as required.

FIG. 1 further shows that the container 12 may include a hatch or manlid 26, which can be used for personnel to access an interior of the container 12. For instance, a sufficiently large hatch 26 may be desirable to inspect the interior or to install various devices, e.g., thermometers, viscosity sensors, etc. (not shown) for cargo monitoring purposes. By way of example, a suitable manlid that may be used as the hatch 26 is disclosed by Podd in U.S. Patent Application Publication No. 2007-0193649, filed Feb. 17, 2006, which is incorporated by reference thereto.

Also shown in FIG. 1, a fill connection 28 is provided for attaching a hose or line for filling the container 12 with liquid or powered cargo. A vent connection 30 is located at or near the upper surface 16 at or near the discharge end 20 to permit trapped air in the container 12 to escape and to permit the container 12 to be filled as fully as possible. Also as shown in this example, the discharge connection 32 is located in or near the bottom surface 18 of the discharge end 20 to leverage the incline 24 to facilitate complete product discharge.

FIG. 1 also shows a manlid clean out port 34. The manlid clean out port 34 may differ from the hatch 26 in that the manlid clean out port 34 may be larger in circumference than the hatch 26 and/or the manlid clean out port 34 may be configured to require at least two people for operation to ensure personnel safety. Likewise, one or more steps or handholds 36 may be formed in or attached to the container 12 for easy access by and safety of workers. In general, therefore, vent, fill and discharge connections may be located at a readily accessible rear area such as in this example for worker safety. However, it will be understood that the exemplary arrangement shown in FIG. 1 can be adjusted to meet various government regulations and customer requirements.

Also shown in FIG. 1, the container 12 includes a pallet assembly 38, which may be formed integrally with the container 12. Additionally, or in the alternative, the pallet assembly 38 may be attached to the container 12 by adhesives, latches, nuts, screws, bolts and the like. As shown in this example, the pallet assembly 38 may have one or more openings or apertures 40, 42 to receive tines of a forklift (not shown) for moving the container 12. Accordingly, the container 12 does not require a conventional pallet and straps.

Also in the example of FIG. 1, a plurality of cargo level gauges or markers 44 may be molded onto or into, or painted, or otherwise attached to the container 12 to assist stevedores and loadmasters with judging cargo quantities. In this regard, an opaque or substantially clear thermoplastic may be utilized to manufacture the container 12, which will readily show the loaded cargo relative to the markers 44. On the other hand, a black or other dark color may be desired for the container 12 to shield the cargo from harsh light. Thus, only a relatively small level gauge 44 such as a polycarbonate sight glass may be used to indicate a liquid level. These and other exemplary manufacturing processes for manufacturing the container 12 are discussed in detail below with respect to FIG. 6.

The container 12 may also include a plurality of reinforcing members 46 as shown in FIG. 1 to increase rigidity and durability of the container 12. According to this example, the reinforcing members 46 are spaced a specific distance apart from each other and may run horizontally or vertically, but those skilled in the art will understand and appreciate that the reinforcing members 46 may be spaced farther apart or closer together and may themselves have different widths and shapes other than as shown in the example of FIG. 1. Also, a thickness or thicknesses of the container 12 may be increased or decreased as discussed below with respect to FIG. 2; thus, the number of reinforcing members 46 may be adjusted accordingly. Also as discussed with respect to FIG. 5, ridges, dimples or other reinforcing members 346 may be utilized in addition to or in place of the reinforcing members 46. Thus, the thickness(es) of the container 12, the reinforcing members 46 and/or the ridges 346 can serve to increase rigidity and durability of the container 12 and endow it with stand-alone capability for consumable cargo storage or for shipping the consumable cargo.

With continued reference to FIG. 1, the container 12 is shown inserted in the dry box 14, briefly introduced above, which may convert the dry box 14 into an economical bulk liquid shipping container. As shown, the dry box 14 includes one or more cargo doors 64, which open into a plurality of interior surfaces 66, such as walls, a floor and a ceiling. The interior surfaces 66 define an interior space 68 in which the container 12 sits securely. More specifically, the exterior surfaces of the container 12 may mate against the interior surfaces 66 to immobilize the container 12 during shipment and also to utilize maximum cargo space. As noted above, the vents, fill and discharge connections, and hatches of the container 12 may be located near the cargo doors 64 for worker safety and convenience.

Turning now to FIG. 2, an alternative tank system 110 is shown. Many components and devices of this exemplary system are the same or similar to those of the previous examples; therefore, while some components and aspects are discussed below, reference is made to the foregoing embodiments for a full and enabling description of like or similar components not explicitly discussed.

In the example of FIG. 2, an inflatable device 148, such as a tube or bladder made from polyethylene (PE), for example, is disposed on an internal surface 152 of a tank 112 between the discharge end 120 and the opposing end 122. The inflatable device 148 may include, or is in communication with, an inflation/deflation device 150, which is used to inflate the inflatable device 148. Accordingly, a maximum volume of the tank 112 may be filled with the cargo to increase efficiency and reduce shipping costs. Moreover, the inflatable device 148 may serve as a baffle to prevent the liquid cargo 105 from "sloshing" in the tank 112, which can be harmful during shipping if tanks begin sloshing and create a harmonic rolling effect that may adversely affect the transport ship, train or the like. After the tank 112 is emptied via discharge connection 132, the device 148 can be deflated using the deflation device 150. A vent connection 130 may also be provided.

An inset of FIG. 2 most clearly shows an enlarged cutaway section of the tank 112. As shown, at least a portion of an exterior surface 154 of the tank 112 is made of a durable and weather-resistant material. Examples of materials suitable for use in a punishing shipping environment include polyethylene (PE) (e.g., high-density polyethylene (HDPE) or low-density polyethylene (LDPE)); polypropylene; polyvinyl chloride (PVC); hardened rubber; fiberglass; nylon; polyoxymethylene (i.e., acetal plastic (POM)); polyetheretherketone (PEEK); polyethylene terephthalate (PET); or any natural or synthetic materials (such as thermoplastics); or their combinations.

In one aspect, the exterior surface 154 may have a thickness of about ¼ of an inch to about 1 inch, preferably at least about ½ of an inch or less. Other thicknesses can be provided to meet specific requirements, and, as noted above, thicknesses can be varied throughout the tank 112; for instance, the surface 154 may be relatively thicker near a bottom 118 and relatively thinner near a top 116 of the tank 112.

More specifically, a relatively large tank for storing and shipping liquids can be made from a polymeric material such as polyethylene because a PE tank can be efficiently manufactured, such as by blow molding, vacuum-forming, or rotationally molding, and the polymeric tank is lightweight. Also, a co-extruded layer of ethylene vinyl alcohol copolymer (EVOH) resin or similar layer of material having a high barrier to oxygen may be used in the container 112 to prevent adversely affecting the taste of the product contained within the container 112. EVOH, for instance, is known for its gas barrier properties and its resistance to solvents, chemicals and the like.

In the example shown in FIG. 2, a permeation barrier 156 may have multiple layers including, for instance, an oxygen barrier such as EVOH, depicted here as layer 158, a layer of adhesive 160, and a layer of polymeric material 162 such as PE. As shown, the permeation barrier 156 is disposed on the internal surface 152 of the tank 112 to be in contact with a consumable cargo 105 to prevent adversely affecting the taste of wine, juices, dairy or other consumable liquids or foods, which might occur due to oxygen permeation of PE without a layer 158.

As shown in FIG. 2, the layer 158 is between about 0.001 millimeters to about 5 millimeters to meet more or less stringent permeation requirements. The exemplary EVOH resin is available, for instance, under the brand name EVAL™ from EVAL Europe N.V. in Zwijndrecht, Belgium, although comparable materials from other sources may be substituted. Again, although EVOH is used as the layer 158, any resin or material with suitable gas barrier properties can be substituted for the layer 158. The entire bulk liquid transport system may also be sealed inside a foil laminate or other type of barrier wrapper 194 to protect against exterior contamination. Such a wrapper is available from Powertex of Rouses Point, N.Y. under the brand name POWERFOIL™.

The layer 158 shown in FIG. 2 can be applied to the internal surface 152 of the tank 112 by a spraying process, a lamination process, a dip/bath process, a (co-) extrusion process, a molding process, a vacuum-forming process, an adhesive process and the like. For instance, the layer 158 may be co-extruded with the PE material 162 to protect the EVOH from wear. The layer of adhesive 160 may also be co-extruded and disposed between the layers 158, 162 to adhere the PE and EVOH together since PE and EVOH are not chemically bonded. An adhesive suitable as the adhesive 160 is available under the brand name ADMER GT6E resin from Mitsui Chemicals Europe GmbH of Duesseldorf, Germany. However, it is to be noted that any comparable adhesive suitable for adhering the layers 158, 162 together can be used according to the present invention. It is again to be further noted that although the layers 158, 162 are co-extruded, other processes such as laminations, baths, sprays, overmolding, and the like can be used to form the multi-layer permeation barrier 156.

As further shown in FIG. 2, a heating pad or a plurality of heating strips 165 may be attached to or embedded in or near a bottom surface 118 of the tank 112. The pad 165 may include a plurality of heated water tubes or electrical strips, either of which is configured to supply a sufficiently high temperature to maintain viscosity of, for instance, a syrup cargo without affecting the material makeup of the tank 112 or heat the cargo prior to discharge.

Figure 3:
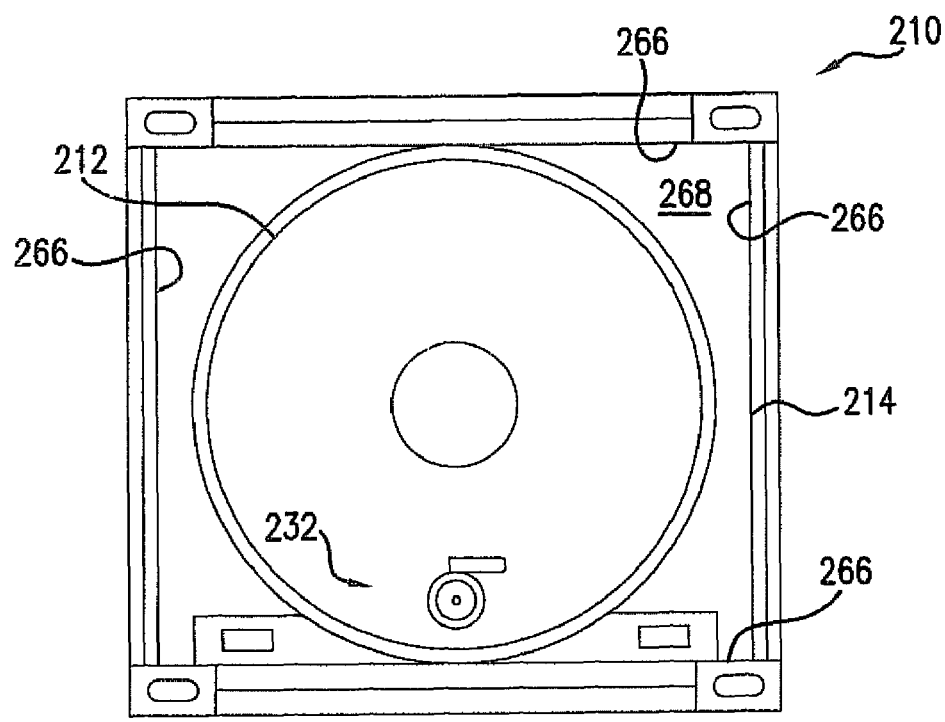
FIG. 3 is a front, elevational view of a container system according to a further aspect of the disclosure.
Figure 4:
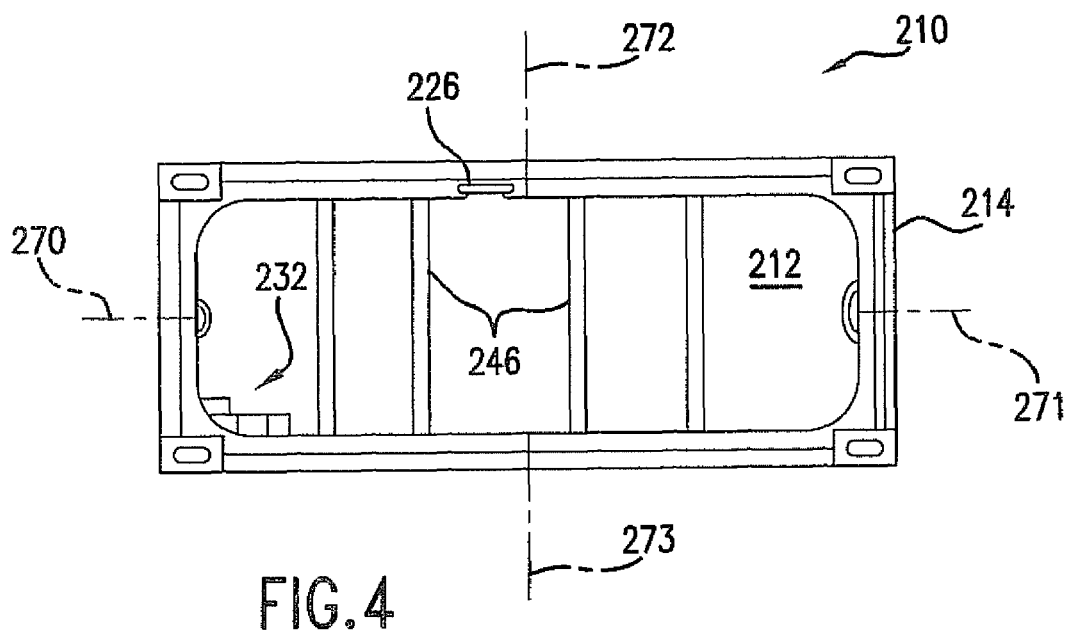
FIG. 4 is a partially cutaway, side elevational view of the container system as in FIG. 3.

With reference now to FIGS. 3 and 4, a further exemplary embodiment of a tank transport system 210 is provided. Once again, many components of this embodiment are the same or similar to elements or components of the previous examples; therefore, some components are discussed below and reference is made to the foregoing embodiments for a full and enabling description of like or similar components not otherwise discussed.

As shown in FIGS. 3 and 4, the tank transport system 210 may include a polymeric tank 212 for transporting and/or storing bulk cargo, such as liquids and powders. Although the tank 212 is manufactured of a rigid, durable polymeric material and is capable of stand-alone use, the tank 212 may also be used with and transported in a shipping container 214, the tank 212 being sized to closely fit the dimensions provided by the interior surfaces 266 of shipping container 214 and to fill interior space 268. The tank 212 may include a hatch 226, a discharge connection 232, and reinforcing members 246. Reinforcing members 246 may be formed by ridges in the vacuum mold or rotational mold (in which case reinforcing members 246 project inwardly from the exterior surface of tank 212) or by depressions in the vacuum mold or rotational mold (in which case reinforcing members 246 project outwardly from the exterior surface of tank 212).

As shown most clearly in FIG. 4, the tank 212 may be a vacuum-formed or rotationally molded thermoplastic tank, which is substantially cylindrical in shape in this example. As shown, the tank 212 has a major axis 270 and a minor axis 272; i.e., the exemplary tank 212 is longer horizontally than vertically. As further shown, the shipping container 214 has a second, complementary major axis 271, and a second, complementary minor axis 273, which are respectively co-axial with the major and minor axes 270, 272 of the tank 212. Although space appears between the tank 212 and the shipping container 214 in FIG. 4, it will be appreciated that the space is exaggerated merely to show the axes 270, 271, 272, 273 most clearly.

Figure 5:
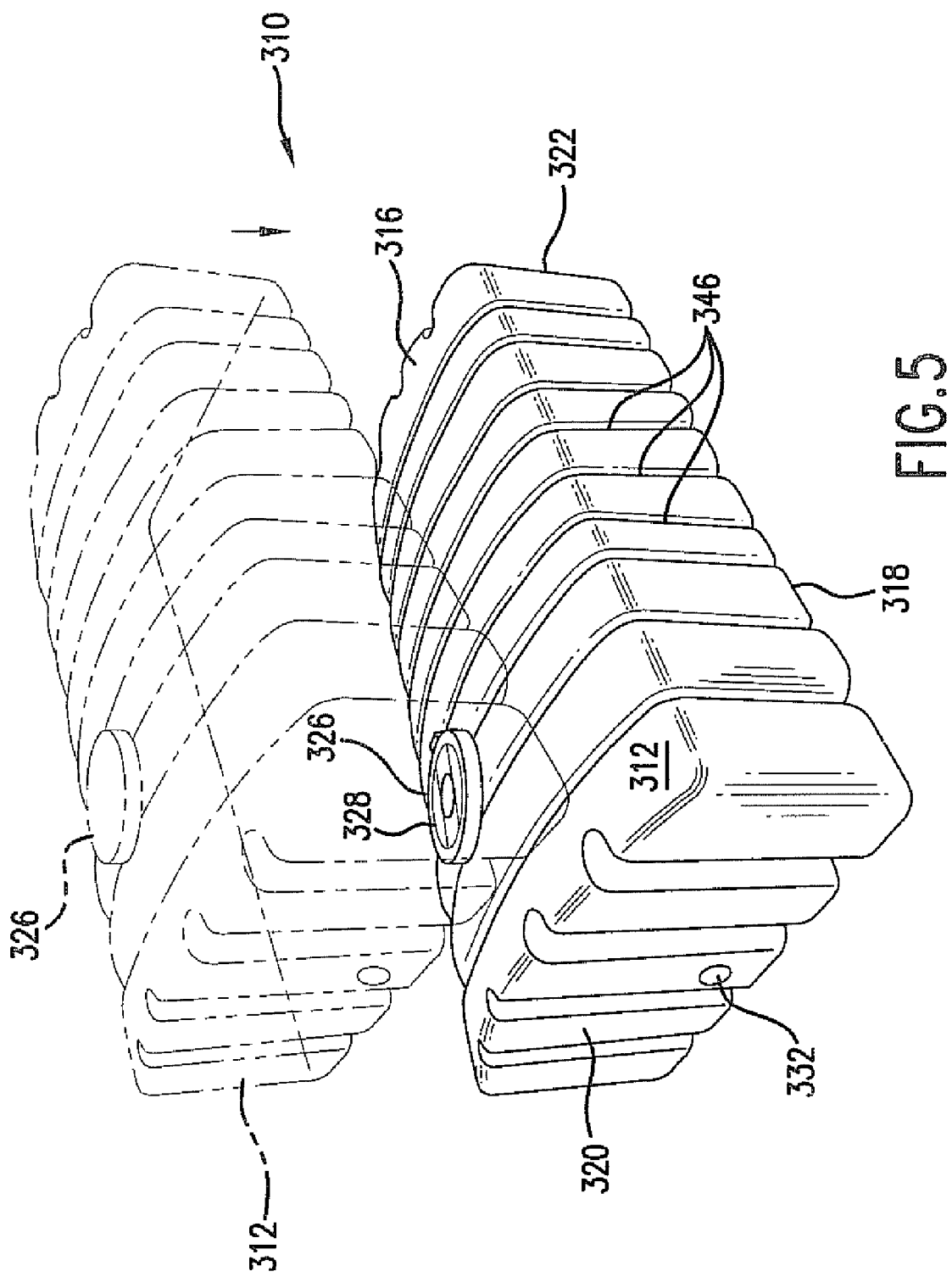
FIG. 5 is a perspective view of a container according to an additional aspect of the disclosure.

Turning now to FIG. 5, an alternative embodiment of a tank transport system 310 is shown, which includes a tank 312. As above, many components of this embodiment are the same or similar to elements or components of the previous examples; therefore, some components are discussed below and reference is made to the foregoing embodiments for a full and enabling description of like or similar components not otherwise discussed.

As shown in FIG. 5, the tank 312 is manufactured of a rigid, durable polymeric material such as PE. The walls and surfaces 316, 318, 320 and 322 are at least about ½ inch in thickness in this example but can be thicker or thinner in various areas, such as corner pressure points, in order to use the tank 312 standing alone as shown for cargo storage or shipping. As discussed relative to the foregoing embodiments, however, the tank 312 may be used with and transported in a dry box, such as the shipping container 214 shown in FIG. 4. Tanks 312 may be fitted with a hatch 326, in which a fill connection 328 is positioned, and a discharge connection 332.

As further shown in FIG. 5 and briefly introduced above with respect to FIG. 1, the tank 312 may have ridges, dimples or other reinforcing members 346. The members 346 can be molded or attached in a variety of shapes and manners to increase rigidity and durability of the container 312 as discussed above. Moreover, the members 346 can be formed to enable a plurality of tanks 312 to be stacked one on top of the other to conserve and maximize limited cargo space. Accordingly, for instance, one tank 312 may carry a first cargo (e.g., wine), while another tank 312 (shown in phantom for clarity) may carry a second cargo (e.g., a powder) in the same shipping container.

Additionally, in a further aspect of the disclosure, at least two empty tanks 312 may fit in a forty foot container for empty repositioning. This is of course a function of the sizes of the tanks 312 and the type of container that may be used to reposition the tanks 312. For example, an insulated, refrigerated container (i.e., a reefer), which although in some ways similar to the dry box 14 discussed above, may require relatively small tanks 312 since an internal width of the reefer may only be about 88 inches, versus 92 inches in the standard dry box 14. Accordingly, the tanks 312 may be sized to fit inside a 40 foot reefer and/or may be placed sideways in the reefer for empty repositioning. Alternatively, if the tanks 312 are each about 92 inches wide, the tanks 312 may be turned on their sides to allow two of them to fit into an 88 inch wide reefer.

The disclosure may be better understood with reference to exemplary manufacturing processes.

As broadly shown in FIG. 6, a tank 412 may be manufactured by rotational molding (rotomolding), injection molding, blow molding, vacuuming forming or the like. By way of example, the rotomolding process may begin with a quality cast or fabricated mold, which is placed in a rotomolding machine. Pre-measured plastic resin such as HDPE is loaded into the mold, and the mold is moved into an oven (see, e.g., heater 476) where the mold is slowly rotated on both vertical and horizontal axes. The melting HDPE resin becomes molten, sticks to the hot mold, and evenly coats every surface of the mold unless otherwise required, e.g., to form various thicknesses. Lastly, the rotomolded shell is moved to a cooling area where it is cooled and the tank released from the mold and sent to the staging or finishing area.

Rotational speed, heating and cooling times are all controlled throughout the foregoing process and each can be adjusted to modify characteristics of the tank 412. As noted above, the tank 412 can have differing thicknesses in particular sections, for instance, about ¾ of an inch of HDPE at a top edge and about ½ inch of HDPE at a bottom surface.

As FIG. 6 most clearly shows, at stage 472 a thermoplastic starting material 470 is provided in the form of thermoplastic sheets or thermoplastic pellets. At stage 474, the thermoplastic material 470 is either heated to a desired temperature or melted by a heater or heating source 476 to form a malleable sheet or a melted mixture. At stage 478, the thermoplastic material 470 is placed or poured into a mold. In this example, the mold is a vacuum mold having a bottom 480 and a top 482. As indicated by the arrows in stage 478, the bottom 480 and the top 482 are pressed together with the heated thermoplastic material 470 therein. Optionally, at this stage, a thermoplastic sheet 492 may be inserted into the mold to reinforce a section of the tank 412. At stage 484, the heated thermoplastic is vacuum formed into a shape complementary to the bottom 480 and the top 482 of the tank mold. More specifically, a vacuum-blower device 486 vacuums the thermoplastic material 470 from both the bottom 480 and the top 482 while simultaneously blowing air into the mold to form the hollow interior of the tank 412.

At stage 488, the vacuum-formed tank 412 is removed from the mold and cooled. The skilled artisan will appreciate that the bottom 480 and the top 482 of the mold may be formed with depressions, projections and the like 440, 446 to create respective ridges, dimples, apertures, reinforcing members and the like in the tank 412 as discussed in detail with respect to FIG. 5 above.

At stage 490 in FIG. 6, various hatches 426, filling connections 428, discharge connections 432, vent connections 430, clean-out ports 434, handholds 436, and the like may be attached to or inserted in the apertures of the formed tank 412.

With more particular reference to one aspect shown in FIG. 6, the thermoplastic material 470 may be at least two sheets of thermoplastic material that are each about ½ inch in thickness at stage 474. After heating the two sheets of thermoplastic material 470 at stage 474 and inserting the malleable sheets into the mold at stage 478, the thermoplastic material 470 is respectively vacuumed from the bottom 480 and a top 482 while air is blown between them to vacuum form the sheets into the tank 412 in approximately five (5) minutes. In this example, after stretching and filling the mold, the sheets 470 and thus the formed tank 412 is about ⅛ of an inch in thickness. However, as discussed in detail above, the thermoplastic material 470, in sheet form, may be thicker or thinner than ½ inch as desired to achieve a different finished tank thickness.

Moreover, the mold and/or the thermoplastic commodity may be varied in thickness to achieve different thicknesses at different points in the finished tank 412, such as greater thicknesses at corner points of the tank 412 to increase durability. Further, the tank 412 may be formed with sufficient thickness and thus strength such that no bulkhead is required. Finally, some of the thermoplastic material 470 (that is, one or more of the sheets or a portion of the pellets) may include material resistant to passage of oxygen, such as EVOH as discussed above.

Figure 7C:
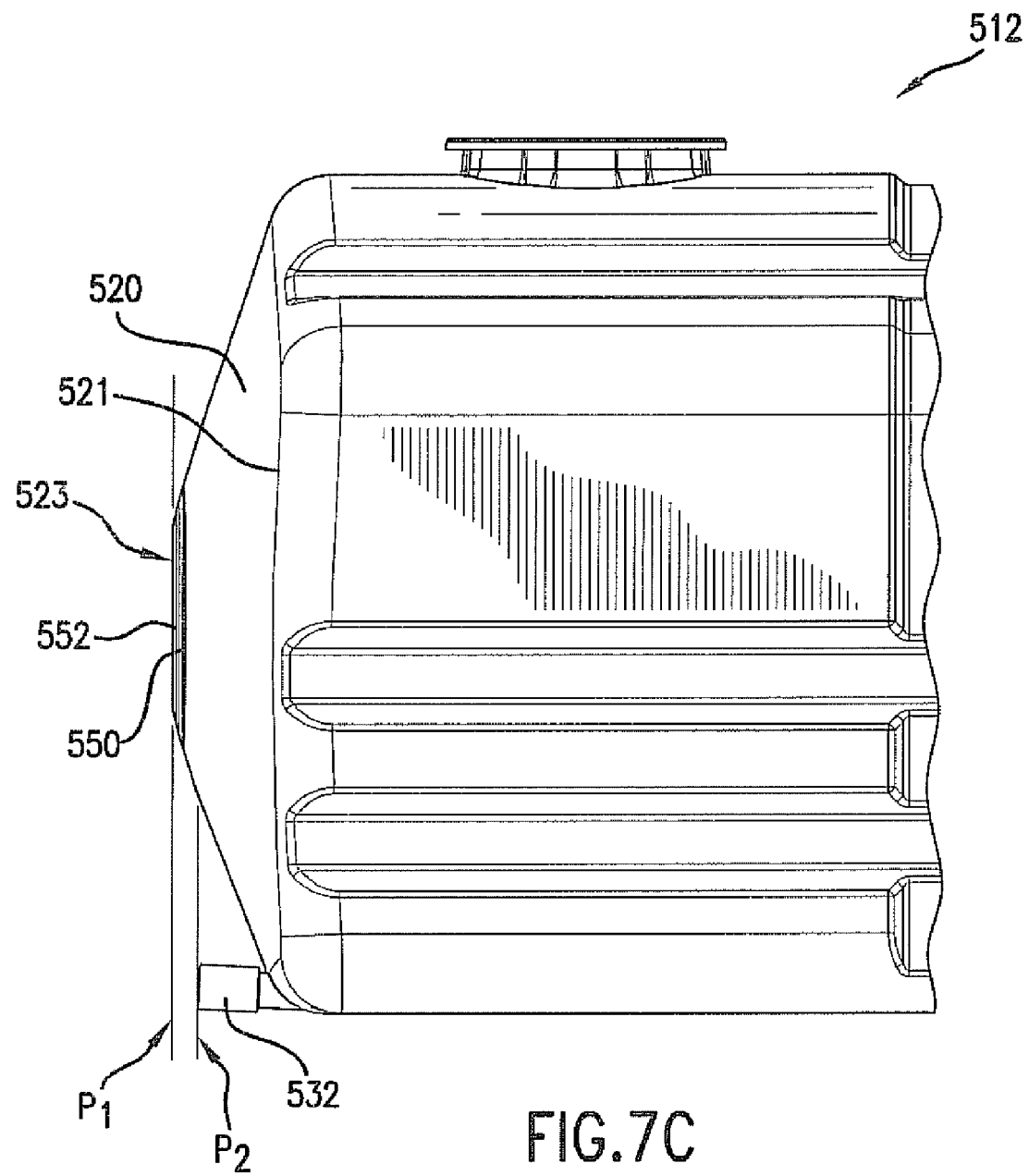
FIG. 7C is a close-up side view of the discharge end of the container of FIG. 7A.

FIGS. 7A through 7E illustrate yet another container 512, formed in accordance with the teachings herein. In FIG. 7A, a container, or tank, 512 is provided, which has an arcuate upper surface 516, a bottom surface 518, a discharge end 520, and an opposing end 522 (opposite discharge end 520). An aperture, or manhole, 534 having a coordinatingly configured manlid 535 is provided in the upper surface 516 of tank 512. As shown, aperture 534 and manlid 535 are positioned advantageously toward the discharge end 520 of tank 512 to facilitate cleaning.

Tank 512 includes a plurality of longitudinally extending reinforcing members 546 and a plurality of transversely extending reinforcing members 548. The reinforcing members 546, 548 protrude into the interior space of the tank 512. The faceted geometry of the reinforcing members 546, 548 aids in the cleaning of the tank interior. Although illustrated as depressions that project inwardly from the exterior surface of the tank 512, reinforcing members 546 may alternately be in the form of protrusions that project outwardly from the exterior surface of tank 512.

The discharge end 520 includes a discharge connection 532, through which the contents of tank 512 are transferred (i.e., either by filling the tank 512 or by emptying the tank 512). The discharge end 520 further includes a pair of cooperative semi-circular panels 550, 552. The first panel 550 is larger than the second panel 552 and is recessed from the second panel 552.

In filling the tank 512, via the discharge connection 532, the right door of the tractor trailer, or other transport container, is opened to expose the discharge connection 532, while the left door most often remains closed. As the contents are transferred into the tank 512, the second semi-circular panel 552 (positioned behind the closed left door of the tractor trailer) may begin to slightly bow out from the exerted pressure on the panels 552, 550, the extent of bowing being limited by the closed trailer door. As filling continues, the first semi-circular panel 550 also tends to bow outwardly toward the terminal end of the tank 512. It the first panel 550 were not recessed from the terminal end of the tank 512, the bowing of the first panel 550 might prevent the trailer door from being closed. However, because the first panel 550 is recessed from the terminal end, any bowing of the first panel 550 that may occur is insufficient to prevent the right door of the tractor trailer from being closed, once filling is completed.

Also in this aspect, the discharge end 520 has a substantially frustopyramidal shape; that is, the discharge end 520 resembles a truncated pyramid having a planar base 521 and a terminal planar surface 523. As shown in FIGS. 7B and 7C, the base 521 is proximate to the opposing end 522, while the terminal planar surface 523 is distal to the opposing end 522. The terminal planar surface 523 is coplanar with the second door 552, occupying a plane identified as $P_1$ in FIG. 7C. FIG. 7C further shows that the discharge connection 532 terminates in a plane $P_2$, which is located between the planar base 521 of discharge end 520 and the terminal planar surface 523.

This arrangement prevents the discharge connection 532 from being damaged by incidental contact with the doors of the shipping container (not shown) in which tank 512 is transported.

Figure 7D:
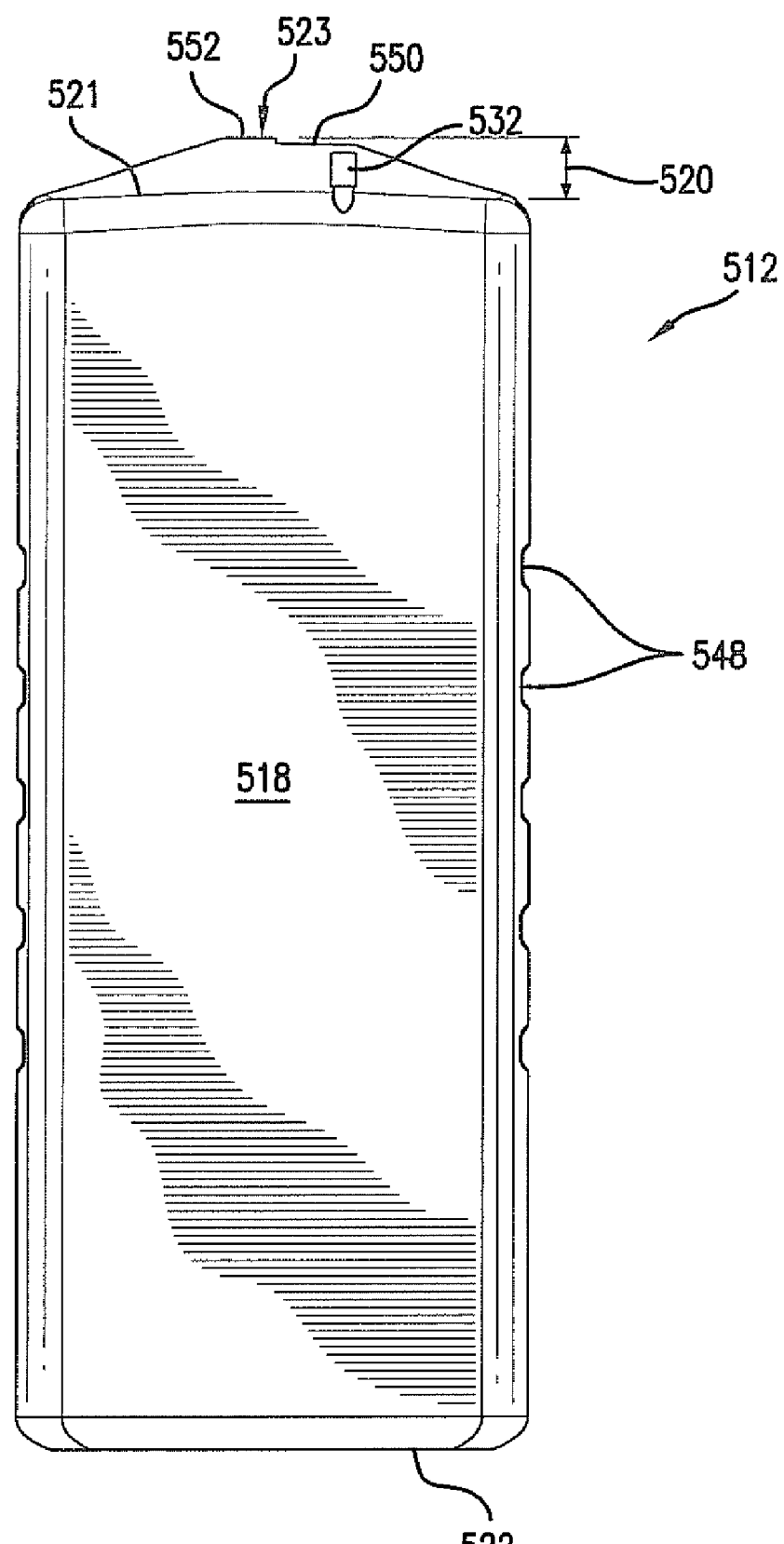
FIG. 7D is a plan view of the bottom surface of the container of FIG. 7A.

The positioning of the discharge connection 532 relative to the terminal planar surface 523 of the discharge end 520 may be clearly seen in FIG. 7D, which is an illustration of the tank 512 from the bottom 518. The discharge end 520 is visible at the top of the illustration. As shown, the second panel 552 is coplanar with the terminal surface 523 of the discharge end 520. The first panel 550 is slightly recessed from this plane, and the discharge connection 532 is yet further recessed from the plane of the first panel 550. No reinforcing members are provided along the bottom 518 of the tank 512, because such reinforcing members would act as a "dam" and prevent the complete drainage of the contents of tank 512 during discharge.

Figure 7E:
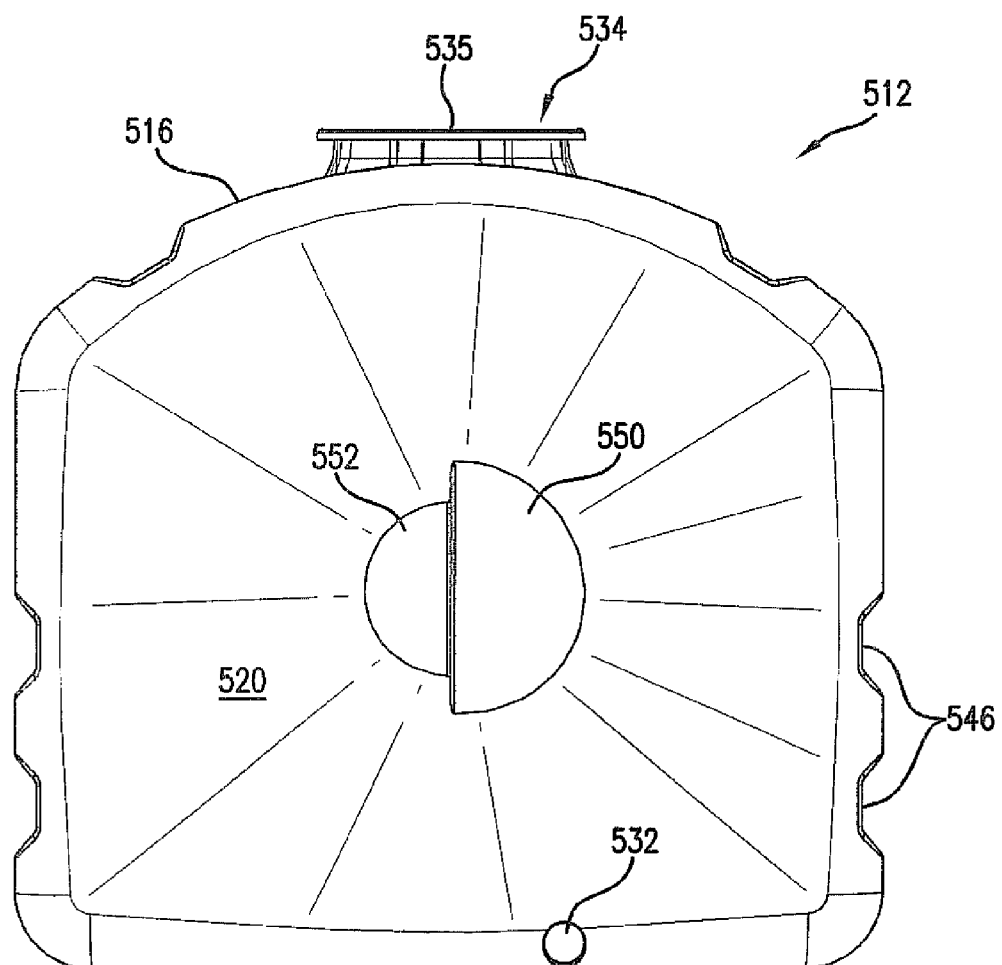
FIG. 7E is a plan view of the discharge end of the container of FIG. 7A.

FIG. 7E shows, in greater detail, the discharge end 520 with first panel 550 and second panel 552. The discharge connection 532 is positioned near the bottom surface 518 of tank 512 to facilitate transfer of the contents into and out of the tank. Upper surface 516 may include an arcuate, or arced, surface to maximize tank capacity within a given shipping container. Positioned along upper surface 516 and proximate to the discharge end 520 is an aperture, or manhole, 534, which is fitted with a manlid 535. The aperture 534 may be located at other positions along upper surface 516, although positioning toward the discharge end 520 may be beneficial for reasons that will be described herein.

Figure 8:
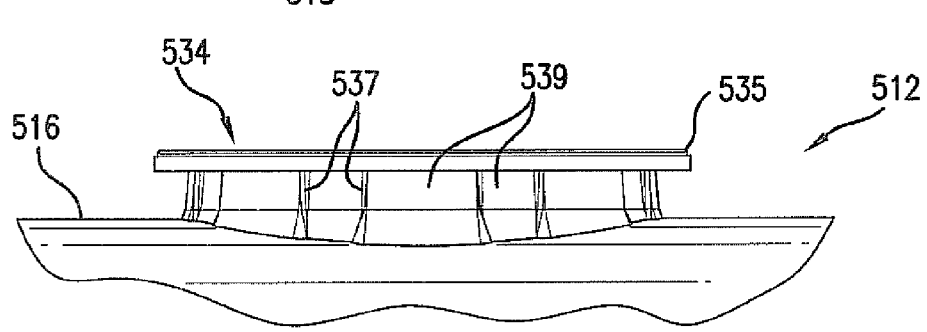
FIG. 8 is a side perspective view of a manlid, suitable for use with the container of FIG. 7A.

FIG. 8 shows, in greater detail, the aperture, or manhole, 534 through the upper surface 516 of the thermoplastic tank. A manlid 535 is configured to mate with the aperture 534. The aperture 534 is reinforced by a plurality of reinforcing ribs 537 that protrude from the perimeter surface area 539 of the aperture.

Figure 9:
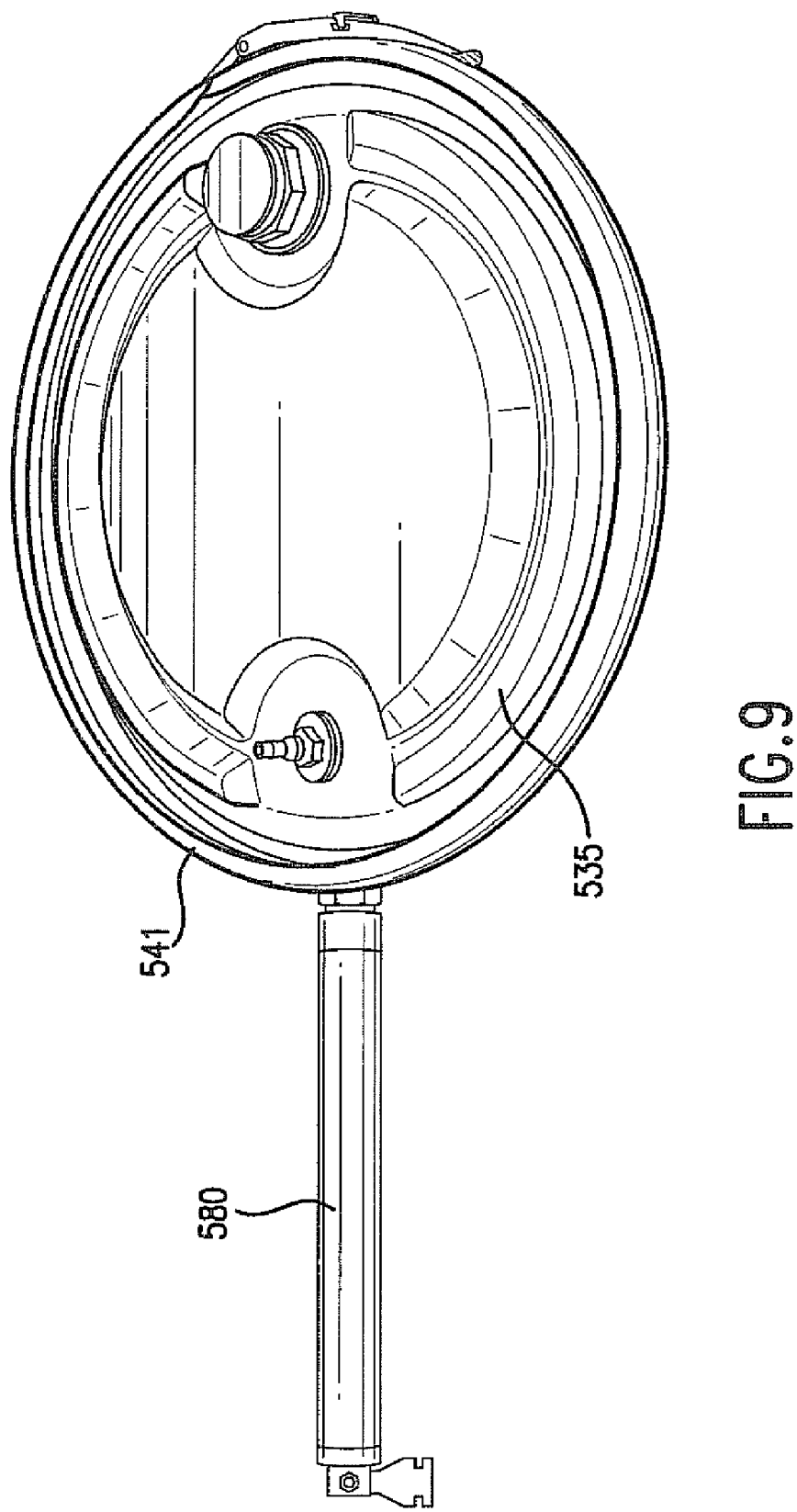
FIG. 9 is an isometric view of the manlid of FIG. 8 to which has been attached a fluid-filled cylinder.
Figure 11:
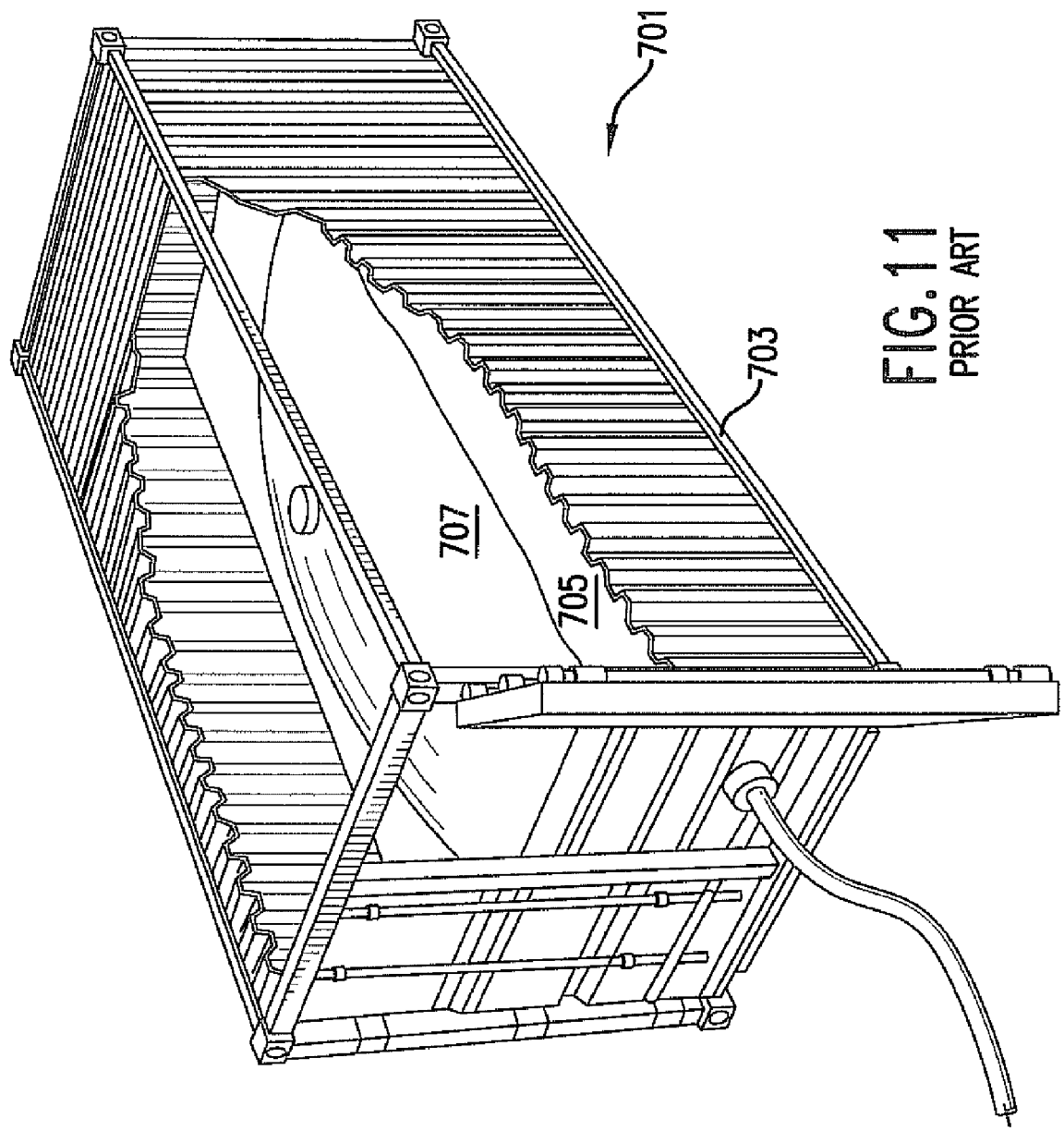
FIG. 11 is partially cutaway, perspective view of a conventional shipping system.

FIG. 9 is an illustration of manlid 535. As shown, manlid 535 includes a fluid-filled cylinder 580, which is attached to a perimeter portion of the manlid. The manlid 535 may be attached to the aperture 534 (as shown in FIG. 8) by means of a clamping ring 541, although other mechanisms for securing the manlid 535 to the aperture 534 may instead be used. The fluid-filled cylinder 580, or fluid cylinder, may be a hydraulic cylinder or a pneumatic cylinder.

FIGS. 10A and 10B illustrate the use of the fluid-filled cylinder 580 in moving the tank 512 into and out of a transport container 514. One end of the fluid-filled cylinder 580 is attached to the interior ceiling 566 of transport container 514, and the opposite end of the fluid-filled cylinder 580 is attached to the perimeter of the aperture, or manhole, 534. This operative relationship allows the tank 512 to be moved into and out of the transport container through the action of a piston 582 of the fluid-filled cylinder 580.

FIG. 10A is representative of the tank 512 during transport. As shown, the piston 582 of fluid cylinder 580 is retracted, and the tank 512 is positioned inside the transport container 514. When the piston 582 of fluid cylinder 580 is extended, as shown in FIG. 10B, the tank 512 is pushed out of the transport container 514, exposing the manlid 535 and clearing the discharge connection (not shown) from the interior of the transport container. In such configuration, the tank 512 may be easily filled (via the discharge connection 532) or cleaned (via the aperture or manhole 534).

Further, by incorporating the fluid cylinder 580 in operative relationship between the transport container 514 and the tank 512, a viable, long-term transport system is provided. Specifically, the tank 512 may be extended, cleaned, retracted, filled with cargo, transported, emptied, and then the process repeated with a second cargo, without having to remove the tank 512 from the transport container 514. Such a system significantly reduces time and expense in the shipping industry by eliminating the need for separating the tank from the transport container.

The method of cleaning the present thermoplastic tank includes the steps of inserting at least one revolving sprayhead through the manhole; activating the revolving sprayhead to spray a liquid at the interior surfaces of the thermoplastic tank; and draining the liquid through the discharge connection. A cleaning liquid may be selected based on the properties of the contents that were last transported (i.e., that are being cleaned from the tank). Accordingly, the liquid may be water, hot water, diesel fuel, caustic, solvents, detergents, chemical strippers, and appropriate combinations thereof.

In the case of rotationally molded tanks, the interior surfaces of the thermoplastic tanks are exceptionally smooth. Such a smooth surface results from the rotational molding process, in which the polymer pellets are melted into a molten form and allowed to cool within a closed mold in the absence of potential contaminants. Moreover, the thermoplastic tanks may include reinforcing members that project inwardly into the interior surfaces of the tank. These reinforcing members may possess a geometry having multiple facets (i.e., smaller planar surfaces), about which the contents and cleaning solutions tend to flow. Thus, this multi-faceted configuration, or geometry, promotes discharge of the contents, as well as cleaning.

While preferred embodiments have been shown and described, those skilled in the art will recognize that other changes and modifications may be made to the foregoing examples without departing from the scope and spirit of the disclosure. For instance, various durable materials can be used for the tank as described herein and a variety of shapes and geometries can be achieved using different molds. It is intended to claim all such changes and modifications as fall within the scope of the appended claims and their equivalents.

We claim:

1. A thermoplastic bulk transport tank comprising:
   a discharge end and an opposing end opposite the discharge end, and further comprising an upper surface defining a manhole therethough,
   the discharge end being substantially frustopyramidally shaped, having a planar base that is proximal to the opposing end, a terminal planar surface distal to the opposing end, and a discharge connection proximate to and extending from the discharge end,
   the discharge end further having a first panel and a corresponding second panel located therein, the first panel being recessed from the terminal planar surface and the second panel being coincident with the terminal planar surface,
   the bulk transport tank being rigidly configured for holding a consumable cargo.

2. The bulk transport tank of claim 1, wherein the bulk transport tank is a rotationally molded thermoplastic tank.

3. The bulk transport tank of claim 1, wherein the bulk transport tank is comprised of polyethylene.

4. The bulk transport tank of claim 1, wherein the bulk transport tank includes a material resistant to the passage of oxygen.

5. The bulk transport tank of claim 4, wherein the material includes an ethylene vinyl alcohol copolymer resin.

6. The bulk transport tank of claim 1, wherein the first panel is larger than the second panel, the first panel being located on the same side of the thermoplastic tank as the discharge connection.

7. The bulk transport tank of claim 1, wherein the discharge connection is in communication with an internal surface of the bulk transport tank and is configured to transfer the consumable cargo into and out of the bulk transport tank.

8. The bulk transport tank of claim 7, wherein the discharge connection extends from the discharge end in the direction of the terminal surface and terminates at a plane between the base and the terminal surface of the discharge end.

9. The bulk transport tank of claim 1, wherein the bulk transport tank further comprises a component selected from the group consisting of an air vent, a hatch, a handhold, and a heating device.

10. The bulk transport tank of claim 1, wherein the manhole is reinforced by a plurality of reinforcing members.

11. The bulk transport tank of claim 10, further comprising a manlid configured for mating with the manhole.

12. The bulk transport tank of claim 1, wherein the bulk transport tank further comprises a plurality of reinforcing members configured to increase the rigidity of the bulk transport tank, the reinforcing members being integral to the bulk transport tank.

13. A bulk transport system comprising:
   (a) a thermoplastic bulk transport tank comprising a discharge end and an opposing end opposite the discharge end, and further comprising an upper surface defining a manhole therethrough,
      a first major axis of the thermoplastic tank being oriented longitudinally between the discharge end and the opposing end and a first minor axis of the thermoplastic tank being oriented transverse to the first major axis and being disposed between the discharge end and the opposing end,
      the discharge end being substantially frustopyramidally shaped, having a planar base that is proximal to the opposing end, a terminal planar surface distal to the opposing end, and a discharge connection proximate to and extending from the base,
      the discharge end further having a first panel and a corresponding second panel located therein, the first panel being recessed from the terminal planar surface and the second panel being coincident with the terminal planar surface, the bulk transport tank being rigidly configured for holding a consumable cargo;
   (b) providing a transport container having a second major axis and a second minor axis, the second major and minor axes being complementary to the first major and minor axes of the bulk transport tank, the transport container having walls, a floor, and a ceiling, thereby defining an interior space for receipt of the bulk transport tank; and
   (c) a fluid-operated cylinder, a first end of the fluid cylinder being attached to a perimeter of the manhole and an opposite end of the fluid cylinder being attached to the ceiling of the transport container to facilitate movement of the bulk transport tank into and out of the transport container.

14. The bulk transport system of claim 13, wherein the fluid cylinder is a hydraulic cylinder.

15. The bulk transport system of claim 13, wherein the fluid cylinder is a pneumatic cylinder.

16. The bulk transport system of claim 13, wherein the first panel is larger than the second panel, the first panel being located on the same side of the bulk transport tank as the discharge connection.

17. The bulk transport system of claim 13, wherein the transport container further comprising a first door and a second door, the first and second doors being located at an end thereof, the discharge end of the thermoplastic tank being positioned proximate the first and second doors.

18. A method of moving a thermoplastic tank into and out of a transport container, the method comprising:
   (a) providing a thermoplastic bulk transport tank comprising a discharge end, an opposing end opposite the discharge end, and further comprising an upper surface defining a manhole therethrough,
      a first major axis of the thermoplastic tank being oriented longitudinally between the discharge end and the opposing end and a first minor axis of the thermoplastic tank being oriented transverse to the first major axis and being disposed between the discharge end and the opposing end,
      the discharge end being substantially frustopyramidally shaped, having a planar base that is proximal to the opposing end, a terminal planar surface distal to the opposing end, and a discharge connection proximate to and extending from the base,
      the discharge end further having a first panel and a corresponding second panel located therein, the first panel being recessed from the terminal planar surface and the second panel being coincident with the terminal planar surface,
      the thermoplastic tank being rigidly configured for holding a consumable cargo;
   (b) providing a transport container having a second major axis and a second minor axis, the second major and minor axes being complementary to the first major and minor axes of the thermoplastic tank, the transport container having walls, a floor, and a ceiling, thereby defining an interior space for receipt of the thermoplastic tank; and
   (c) operatively installing a fluid-operated cylinder by attaching a first end of the fluid cylinder to a perimeter of the manhole and attaching an opposite end of the fluid cylinder to the ceiling of the transport container, such that retraction of a piston of the fluid cylinder causes the thermoplastic tank to move into the transport container and extension of the piston of the fluid cylinder causes the thermoplastic tank to move out of the transport container.

* * * * *